United States Patent
Mathews et al.

(10) Patent No.: US 11,520,571 B2
(45) Date of Patent: Dec. 6, 2022

(54) SOFTWARE DEFINED MANUFACTURING/ASSEMBLY SYSTEM

(71) Applicant: Bright Machines, Inc., San Francisco, CA (US)

(72) Inventors: Brian Philip Mathews, Burlingame, CA (US); Ronald Poelman, Wassenaar (NL)

(73) Assignee: Bright Machines, Inc., San Francisco, CA (US)

( * ) Notice: Subject to any disclaimer, the term of this patent is extended or adjusted under 35 U.S.C. 154(b) by 0 days.

(21) Appl. No.: 16/949,753

(22) Filed: Nov. 12, 2020

(65) Prior Publication Data
US 2021/0149655 A1    May 20, 2021

Related U.S. Application Data

(60) Provisional application No. 62/934,517, filed on Nov. 12, 2019.

(51) Int. Cl.
| | | |
|---|---|---|
| *G06F 9/44* | (2018.01) | |
| *G06F 9/455* | (2018.01) | |
| *G06F 8/60* | (2018.01) | |
| *G06F 8/20* | (2018.01) | |
| *G06F 8/71* | (2018.01) | |

(52) U.S. Cl.
CPC .............. *G06F 8/60* (2013.01); *G06F 8/20* (2013.01); *G06F 8/71* (2013.01)

(58) Field of Classification Search
CPC .............. G06F 8/20; G06F 8/60; G06F 8/71
See application file for complete search history.

(56) References Cited

U.S. PATENT DOCUMENTS

| | | |
|---|---|---|
| 7,403,835 B2 | 7/2008 | Sandner et al. |
| 7,996,113 B2 | 8/2011 | Yuan et al. |

(Continued)

FOREIGN PATENT DOCUMENTS

| | | |
|---|---|---|
| CN | 106426158 A | 2/2017 |
| CN | 110795874 A | 2/2020 |

(Continued)

OTHER PUBLICATIONS

Niki Kousi, Digital twin for adaption of robots' behavior in flexible robotic assembly lines, 2019, pp. 121-127. https://www.researchgate.net/publication/330669566_Digital_twin_for_adaptation_of_robots%27_behavior_in_flexible_robotic_assembly_lines (Year: 2019).*

(Continued)

*Primary Examiner* — Mongbao Nguyen
(74) *Attorney, Agent, or Firm* — Nicholson De Vos Webster & Elliott LLP; Judith Szepesi

(57) ABSTRACT

The present system is a software defined manufacturing (SDM) system that integrates several technologies and methods into a system that automates the process of engineering and operating automated manufacturing systems (aka "automating automation"). In one embodiment, some or all of the below aspects of the "automating automation" system are integrated: modular, configurable, reusable manufacturing cells; computer vision systems; autocalibration systems; a recipe-based programming environment; configuration management system; production analytics; and a marketplace for sharing recipes.

20 Claims, 16 Drawing Sheets

(56) References Cited

U.S. PATENT DOCUMENTS

| | | | |
|---|---|---|---|
| 9,643,314 | B2 | 5/2017 | Guerin et al. |
| 9,671,777 | B1 | 6/2017 | Aichele et al. |
| 9,707,680 | B1 | 7/2017 | Jessen et al. |
| 9,796,083 | B2 | 10/2017 | Atohira et al. |
| 9,811,074 | B1* | 11/2017 | Aichele ............... B25J 9/1656 |
| 9,840,007 | B1 | 12/2017 | Kuffner |
| 9,844,882 | B2 | 12/2017 | Takizawa et al. |
| 9,971,914 | B2 | 5/2018 | Maturana et al. |
| 10,279,480 | B1 | 5/2019 | Holson et al. |
| 10,456,915 | B1 | 10/2019 | Diankov |
| 10,475,240 | B2 | 11/2019 | Evans et al. |
| 10,576,635 | B2 | 3/2020 | Ogawa et al. |
| 10,596,700 | B2 | 3/2020 | Corkum et al. |
| 10,773,386 | B2 | 9/2020 | Yamauchi et al. |
| 10,782,668 | B2 | 9/2020 | Bank et al. |
| 10,875,176 | B2 | 12/2020 | Radrich et al. |
| 2008/0013825 | A1 | 1/2008 | Nagatsuka et al. |
| 2014/0297244 | A1 | 10/2014 | Maturana et al. |
| 2015/0134317 | A1 | 5/2015 | Maturana et al. |
| 2015/0239127 | A1* | 8/2015 | Barajas ............... B25J 9/1671 700/253 |
| 2015/0321352 | A1 | 11/2015 | Debain et al. |
| 2016/0243704 | A1 | 8/2016 | Vakanski et al. |
| 2018/0029232 | A1 | 2/2018 | Ouchi et al. |
| 2018/0356895 | A1* | 12/2018 | Dailey ............... G06F 3/017 |
| 2019/0056928 | A1* | 2/2019 | Smal ............... G06F 21/602 |
| 2019/0084160 | A1 | 3/2019 | Liu et al. |
| 2019/0291277 | A1* | 9/2019 | Oleynik ............... B25J 9/1669 |
| 2019/0308320 | A1 | 10/2019 | Konishi |
| 2019/0389060 | A1 | 12/2019 | Roy Chaudhuri et al. |
| 2020/0024853 | A1 | 1/2020 | Furrer et al. |
| 2020/0030979 | A1* | 1/2020 | Bank ............... B25J 13/08 |
| 2020/0086483 | A1 | 3/2020 | Li et al. |
| 2020/0156251 | A1 | 5/2020 | Huang et al. |
| 2020/0159648 | A1* | 5/2020 | Ghare ............... G06F 11/3013 |
| 2020/0171671 | A1 | 6/2020 | Huang et al. |
| 2020/0206913 | A1 | 7/2020 | Kaehler |
| 2020/0225655 | A1 | 7/2020 | Cella et al. |
| 2020/0265329 | A1* | 8/2020 | Thomsen ............... G05B 13/041 |
| 2020/0276714 | A1 | 9/2020 | Declerck et al. |
| 2020/0301510 | A1* | 9/2020 | Birchfield ............... G01L 5/226 |
| 2020/0310394 | A1* | 10/2020 | Wouhaybi ............... G05B 19/042 |
| 2021/0018903 | A1* | 1/2021 | Mu ............... G05B 19/4188 |
| 2021/0046639 | A1* | 2/2021 | Ravi ............... G05B 19/4182 |
| 2021/0096824 | A1* | 4/2021 | Stump ............... G06F 11/3684 |
| 2021/0133670 | A1* | 5/2021 | Cella ............... G06N 5/04 |
| 2021/0138651 | A1* | 5/2021 | Mcgregor ............... B25J 9/1671 |
| 2021/0323167 | A1* | 10/2021 | Hemes ............... G05B 19/4083 |
| 2021/0369353 | A1* | 12/2021 | Nikou ............... A61B 34/30 |
| 2021/0375439 | A1* | 12/2021 | Mckinnon ............... G16H 40/67 |

FOREIGN PATENT DOCUMENTS

| | | |
|---|---|---|
| EP | 2498156 A2 | 9/2012 |
| EP | 2871544 A2 | 5/2015 |
| WO | 2018/196232 A1 | 11/2018 |
| WO | 2019/064916 A1 | 4/2019 |
| WO | 2019/113618 A1 | 6/2019 |
| WO | 2019/113619 A1 | 6/2019 |
| WO | 2020/053083 A1 | 3/2020 |
| WO | 2020/190272 A1 | 9/2020 |

OTHER PUBLICATIONS

Marc Priggemeyer, Interactive calibration and visual programming of reconfigurable robotic workcells, 2018, pp. 1936-1401. https://ieeexplore.IEEE.org/document/8452707 (Year: 2018).*

Stefan Profanter, A Hardware-Agnostic OPC UA Skill Model for Robot Manipulators and Tools, 2019, pp. 1061-1068. https://ieeexplore.IEEE.org/stamp/stamp.jsp?tp=&arnumber=8869205&isnumber=8868236 (Year: 2019).*

Igor Azkarate Fernandez, Virtual commissioning of a robotic cell: an educational case study, 2019, pp. 1-6. https://ieeexplore.ieee.org/stamp/stamp.jsp?tp=&arnumber=8869373 (Year: 2019).*

Alexei Vassiliev, Designing The Built-In Microcontroller Control Systems of Executive Robotic Devices Using The Digital Twins Technology, 2019, pp. 1-5. https://ieeexplore.ieee.org/stamp/stamp.jsp?tp=&arnumber=8843814 (Year: 2019).*

International Search Report and Written Opinion, PCT App. No. PCT/US2020/070778, dated Mar. 29, 2021, 13 pages.

Maragkos et al., "Virtual Reality Assisted Robot Programming for Human Collaboration", 29th International Conference on Flexible Automation and Intelligent Manufacturing, Procedia Manufacturing, vol. 38, 2019, pp. 1697-1704.

Wikipedia, "Digital Twin", Available Online at <https://en.wikipedia.org/w/index.php?t%20itle=Digital%20twin&oldid=924505803#Industry%20-level%20dynam,cs>, Nov. 4, 2019, 16 pages.

* cited by examiner

SOFTWARE DEFINED MANUFACTURING/ASSEMBLY SYSTEM

RELATED APPLICATION

The present application claims priority to U.S. Provisional Application No. 62/934,517, filed on Nov. 12, 2019, and incorporates that application by reference in its entirety.

FIELD

The present invention relates to robotics, and in particular to a software defined manufacturing/assembly system.

BACKGROUND

While automation equipment and methods have been available for manufacturing products for decades, such automation systems are not always employed, and instead human labor is still commonly used to perform tasks that are automatable.

Automation is Expensive and Time Consuming.

Common reasons for employing manual production labor over automation includes high capital costs of automation related equipment, high costs to engineer automation solutions, and the long time it takes to design, build, deploy, configure, program, and debug automation solutions. Companies wishing to automate a manufacturing task will often outsource the project to a system integrator who will commonly perform work from design to delivery in a way that is customized for the specific manufacturing product and process. While this custom-tailored approach may be more time and more cost efficient for a specific manufacturing project, it does not support efficient reuse of automation equipment or automation engineering to future products and projects. By analogy, a disposable paper cup is cost effective if you only plan to consume one cup of coffee in your life, but a more (initially) expensive reusable coffee mug is more cost efficient over a lifetime of coffee consumption.

Automation Tools are not Integrated into a Workflow Solution

Several tools exist to aid the design, engineering, deployment, debugging, operations, and improvement phases of manufacturing automation projects (from design to delivery to production operations), such as Computer-Aided-Design (CAD) tools, Computer-Aided-Manufacturing (CAM) tools, simulation tools, Enterprise-Resource-Planning (ERP) tools, Manufacturing-Execution-System (MES) tools, programming tools, Internet-of-Things (IoT) tools, etc., but these tools are generally focused on solving specific engineering tasks in isolation.

Deployment and Scaling of Automation Solutions is Expensive and Time Consuming

Automation systems often have configuration data that controls their behavior (including settings and software). For example, screwdriver spin speeds, oven thermostat controls, target robot coordinates, software control programs, etc.). Automation systems often have many different devices (ex. robots, conveyance systems, part feeders, assembly tools, etc.) each with their own configuration data. The normal process of engineering a solution involves designing and managing the configuration data (including software and operating systems) of many devices. Managing such versions during the debugging and process optimization phases is time consuming and error prone. Deploying such solutions to robotic cells is often time consuming and requires expert guidance.

While simulation tools can be used to improve the speed of developing automation solutions, it is often the case that the simulation models employed differ materially from the real world. For example, an engineer might use a simulation tool to develop a program to move a robotic arm through a series of coordinates so as to pick up a screw from a dispenser and place the screw into a product case at the intended screw hole. An issue is that simulation models are often an inaccurate representation of the frequent geometric (positional) variation found in the physical equipment (conveyors, pallets, fixtures, parts, grippers, tooling, etc.). As such, a simulation model of the robot's tool and screw hole positions are unlikely to match the physical reality.

When a robot control program is deployed from the simulation into the physical factory, expert technicians and programmers often need to spend a long time modifying and calibrating such programs to physical reality. Computer vision solutions exist which can help correct for some real-world variations, but such systems often require manual calibration to determine the camera's location and parameters relative to the other automation equipment, tooling, product components, and fixturing.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

Figure 1:
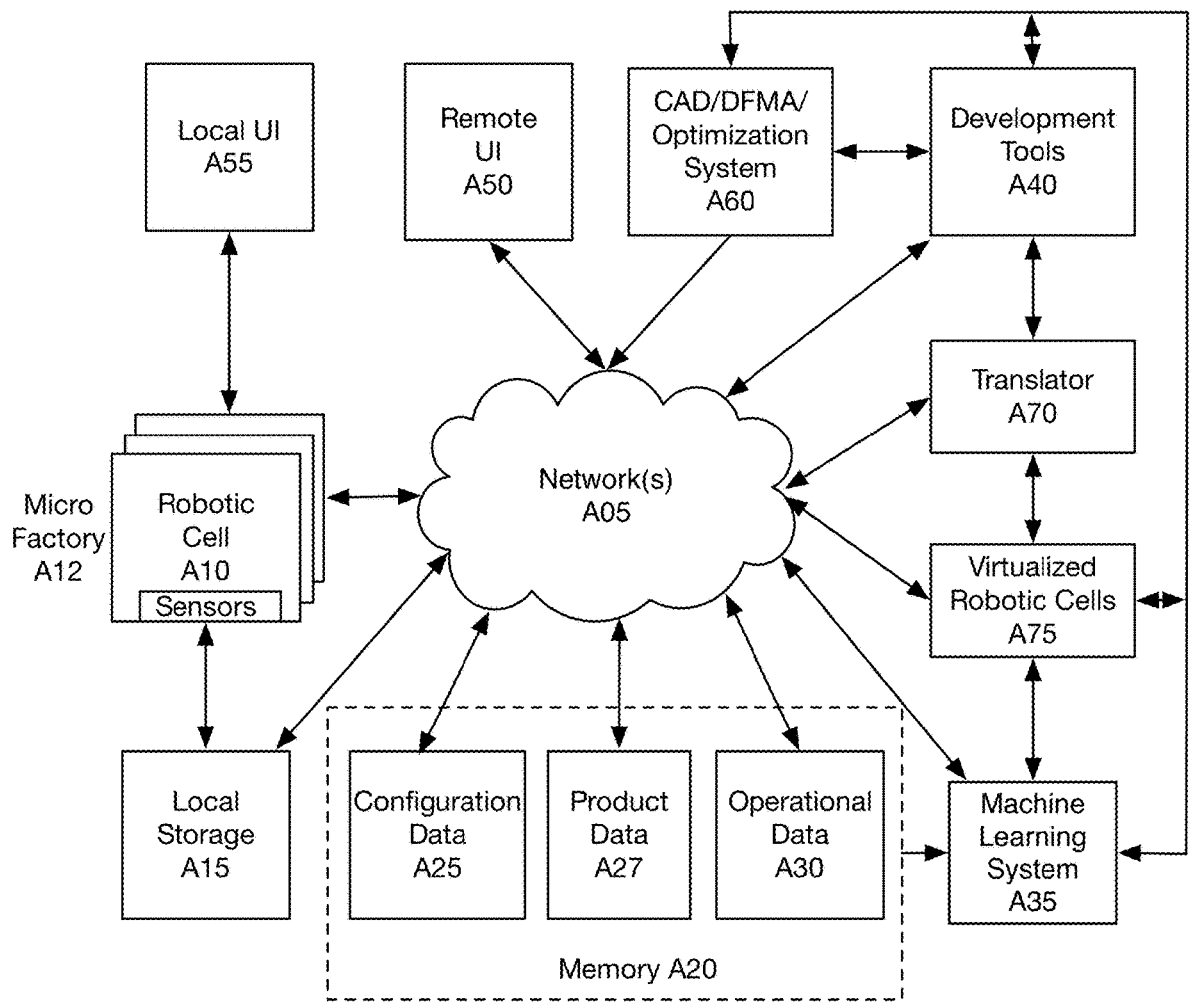
FIG. 1 is a simplified block diagram of one embodiment of a system in which robotic cells may be implemented.

The present application provides an integrated software defined manufacturing system for manufacturing and/or assembly. This system utilizes a modular system of one or more robotic cells assembled together to create a micro-factory. The software defined manufacturing system enables a more efficient, accurate, and faster-to-production system. The system enables the control of the entire manufacturing workflow as well as the production robots, and provides broad benefits to improve the adoption of automation in manufacturing. This provides a software defined manufacturing (SDM) system. In this context, the term SDM includes software defined manufacturing, assembly, and/or inspection. The present system can provide one or more of those manufacturing aspects. SDM is a manufacturing ecosystem that can be automated by software or where software performs functions previously requiring hardware. The benefit of SDM is the ability to have quick, high-quality, and low-cost re-configuration, to solve a different problem without the high costs of human customization. Software automating the hardware, replacing the need for some hardware, and making hardware more adaptable to new situation defines SDM. SDM uses software to automate the design, engineering, deployment, configuration, operation, and improvement workflows of automated manufacturing systems ("automating automation"). This ability to define and control the functionality of hardware via software is provided in the present system. The system may provide one or more of the following advantages:

Provides a software defined manufacturing system that improves the speed and efficiency of creating, maintaining, and improving robotic manufacturing/assembly systems;

Decreases the engineering work and time required to design, test, configure, and debug automation solutions;

Decreases the cost of automation equipment by improving standardization and re-use;

Improve the productive yield of automated processes by improving quality through adaptive sensing and automatic optimization. For example, closed-loop process feedback to improve production configuration settings;

Enables the use of sensor systems to rapidly detect and address deviations from normal operation;

Provides a reference micro-factory model, a virtual representation, based on the sensor data which closely parallels the physical micro-factory, and which has parameters which are updated based on data from the sensor systems;

Enables rapid revision of strategies and programs to achieve the goals of the micro-factory accommodating detected deviations from the normal operation; and Is capable of rapidly switching to new processes and new products, because of its configurability and updateability;

Improves effectiveness of automation (cost, quality, speed, etc.) to manufacture a product via software that improves the design of the product;

Automates programming of manufacturing equipment based on data extracted from CAD data;

Improves manufacturing process design and engineering through process modeling and simulation;

Improves process programming using an integrated software development environment employing declarative methods, hardware virtualization, debugging tools, etc.;

Improves configuration change workflows through configuration management;

Improves speed, accuracy, and process control of workflows for deploying configuration to hardware through Deployment Management;

Improves overall equipment effectiveness of automation systems through software to support local and remote observation, management, and debugging; and Improves quality through automated inspection.

The present system integrates several technologies and methods into a software controlled manufacturing system that automates the process of engineering (designing, deploying, configuring, calibrating, programming, debugging, and improving) and operating automated manufacturing systems (aka "automating automation"). In one embodiment, the techniques enabled by the "automating automation" system may include:

Design for Automation/Design for Manufacturing and Assembly/Generative Programming;

Feedback system to DFA/DFMA/Generative system;

The ability to Import and define computer aided design (CAD) designs for objects to be manufactured and/or assembled;

Process design and configuration of modules that function Online and Offline;

Process programming that can be created, tested, and deployed Offline and Online;

Process programming that provides declarative, high level programming, which is abstracted from the underlying hardware that it is implemented on, and is virtualized;

Virtualized robotic cells and micro-factories which mirror physical devices;

Configuration management, Approvals management, and Workflow management;

Cloud-based deployment, configuration, and reconfiguration;

Integrated debugger systems;

IoT/Monitoring/remote management

Automated quality inspection of the product and product manufacturing process steps; and Continuous improvement of process parameters based on sensor data and machine learning.

The present system provides in one embodiment a software defined manufacturing/assembly system based on modular, configurable, reusable manufacturing cells; computer vision systems; autocalibration systems; a recipe-based programming environment; device abstraction; virtualization; a simulation system, a configuration management system; a configuration deployment system; production analytics; and production configuration optimization. In one embodiment, the recipes for the system are applicable to different robotic cells, and there may be a marketplace for sharing recipes, hardware designs, device drivers, configurations, and integrated solutions.

In one embodiment, the modular, configurable, re-usable manufacturing cells integrate complex elements which may include: safety systems, control systems, conveyance systems, robotics, illumination systems, computer vision systems, metrology and calibration devices, human-machine interfaces, sensors, power supplies and power management systems, and networking and communication systems. These robotic cells can be engineered, configured, and delivered more quickly and cheaply than custom designed systems because the engineering within the robotic cells is pre-done, reused, and optimized over multiple projects. Additionally, the same set of tools and sets or processes can be re-used for subsequent projects, thereby lowering costs and improving quality.

The Computer Vision system in one embodiment utilizes modular vision hardware (lenses, camera, illumination systems, etc.) with software that helps automate configuration.

The Auto-Calibration system in one embodiment uses computer vision and software algorithms that automatically create a lens distortion model, a camera pose estimation, and 3-Dimensional 6-degree-of-freedom calibration model of multiple aspects of the automation cell including markers, fiducials, robot geometry, robot end-of-arm-tool geometry, conveyance geometry, part geometry, carrier geometry, frame geometry, tooling geometry, etc. In one embodiment, calibration is very hardware dependent. In one embodiment, a sensor set may include one or more of: cameras, motion sensors, temperature sensors (ambient, and individual element), air flow sensors, humidity sensors, sound sensors, vibration sensors (feedback on machine state), pressure sensors, position sensors, chemical sensors (ex. Ph levels), molecular sensors (which may include smoke alarms, and air particulates detection), RFID sensors (IoT), radio frequency emission sensors, and other sensors.

In one embodiment, recipes are processes followed by a robotic cell, or a manufacturing line, to produce a certain result. A recipe may be an entire process, or a subpart of a process to manufacture or assemble or inspect, or instruct a robotic cell or micro-factory to perform another set of actions. A recipe in this context, in one embodiment, is a set of actions expressed on top of reusability. The recipe based high-level programming environment is created by the addition of Declarative commands and not just Procedural commands, virtualization of hardware, and device drivers that encapsulate differences and allow the software environment to extend to new and changed hardware. Declarative programming utilizes an approach in which the program describes the desired results without explicitly listing commands or steps that must be performed to achieve it, in contrast with procedural programming.

The system in one embodiment utilizes virtualization to represent and/or simulate the behavior of the robotic cell, or a set of one or more robotic cells working together in a virtualized micro-factory, also known as a reference micro-factory. This virtualized robotic cell, also known as "digital twin" can utilize the same or similar recipes as the physical robotic cell, and can be used to test new processes offline. In one embodiment, the digital twin is calibrated based on the real sensor data from its corresponding physical robotic cell. The digital twin can also be used for monitoring a robotic cell, live. The digital twin can also be used to replay a process, based on captured sensor and status data, to identify deviations from normal or desired operation, effects of wear and tear and other operating conditions, etc. The pairing of the physical devices with the digital twin, or reference micro-factory, provides an on-line/off-line interface, in which programs can be created offline on a digital twin and then deployed online on a physical robotic cell, and programs can be created online on a physical robotic cell and then sent to the digital twin.

The topology fills out the dependencies and parametrizes them so that the system can apply the recipe to the particular device. Defining an action defines the dependencies of that action, which in turn can be used to define the actual elements required to fulfill the dependencies. In some embodiments, multiple elements may be able to be used in the alternative, to fulfill such dependencies. In one embodiment, the system may further limit these elements based on the available elements in the system.

Recipe based high-level programming environments allow users to utilize device-independent and/or declarative command, for example "insert module into socket." From that, in one embodiment, the system determines the specific requirements, such as the sizes of chip & socket, the required robot motion coordinates, and the individual device-specific commands and timings required by the hardware to perform the chip insertion. The command and the specific requirements determined based on the command define the requirements for downstream elements. For example, this defines a specific end-of-arm tool, and an arm that moves in 3D, and can exert a certain amount of pressure, has a certain level of precision, can inspect alignment, etc. The system then utilizes the requirements to configure the robotic cells until no unfulfilled requirements remain. This defines the cell.

In one embodiment, defining the topology of the cell produces an object model, and the system programs against this object model. In one embodiment, the process defines a "dependency graph" which defines a set of skills (of the arm and end-of-arm elements), and layers primitive devices, and applies the recipe based high-level programming, and applies that recipe to the topology. The high level programming enables the creation of reusable components, which can be made available outside this particular context.

A configuration management system manages settings and software and recipes. In one embodiment, the configuration management system provides version control including: tracking, roll-back, check-in, check-out, etc. In one embodiment, the versions of configuration and software data are managed in a change management database that logs changes, maintains configuration relationship data, and enforces workflow policies of who is authorized to perform various tasks involved in updating a configuration (ex. make changes, review changes, approve changes, deploy a configuration version to hardware, etc.). In one embodiment, the configuration management system provides differencing between versions. In one embodiment, the system also provides workflow management, which may include approvals and logging. The configuration management applies to an individual machines and/or a line or micro-factory. It enables configuration and code deployment from the configuration management database to local and/or remote automation equipment. In one embodiment, a configuration deployment system automates the provisioning, deployment, and verification of configuration data between the configuration database and the various hardware components of the automation system. While often a one-way process from the configuration database to the hardware, the system can also be implemented to discover configuration changes manually made on the hardware and record those changes into the configuration database.

In one embodiment, the system provides production analytics and analysis. Production analytics is a system for collection of sensor and process data, and for analyzing the sensor and process data. In one embodiment, the system collects data in real time, and can provide real-time analytics as well as on-going analysis. In one embodiment, analytics may utilize data from across devices and lines.

In one embodiment, the system may further provide a marketplace for discovery, re-use, and sharing of recipes. The ability to create, reuse, and remix recipes increases the functionality and value of the robotic cells.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

FIG. 1 is a simplified block diagram of one embodiment of a system in which robotic cells may be implemented. In one embodiment, robotic cells A10 include one or more individual robotic cells which together form the software defined manufacturing line, or micro factory. In one embodiment, individual robotic cells A10 may be linked via conveyors, and reverse conveyors, so that a single item being manufactured or assembled through the micro factory passes through multiple robotic cells A10 (or multiple times through one or more cells A10). The robotic cells A10 may provide manufacturing, assembly, inspection, and/or testing of products. Thus a robotic cell A10 may be an inspection system such as an automatic optical inspection (AOI) machine, or an assembly system such as a system with a robotic arm to insert a screw, or a manufacturing system such as a CNC machine.

In one embodiment, the robotic cells A10 are controlled by software. In one embodiment, the configuration and control data for the robotic cells A10 are applied to the cell from memory A20. In one embodiment, the memory A20 may be part of a remote system, coupled to the robotic cells A10 via network A05. The configuration data A25 defines the configuration for each robotic cell A10 and the manufacturing line. The configuration data can include software configuration and any other configuration that is controllable through software. For example, a home thermostat has a configuration (the temperature target set-point) which is not itself software, but in some thermostats that set-point configuration can be controlled/modified via software control. Thus, the configuration management can encompass data that is controllable through software, even if it controls hardware settings.

In one embodiment, configuration data may include other configuration elements that may be controlled through software, such as setpoints, pressure, torque, and other settings. The robotic cells A10 collect operational data while being calibrated, tested, or used. This operational data is stored in memory A20 and used by machine learning system A35. In one embodiment, local storage A15 provides backup for configuration data for the robotic cell, as well as operational data produced by the robotic cell while it is in use. Local storage A15 in one embodiment acts as a buffer for memory A20. In one embodiment, if the robotic cell A10 becomes disconnected from the network A05, it may continue to operate and collect real time operational data, using local storage A15.

In one embodiment, because the cells are software configured, a single robotic cell A10 may perform multiple stages in the manufacturing process and may be reconfigured during the manufacturing process. In one embodiment, this also enables the substitution of robotic cells A10 in a micro factory during manufacturing without extensive manual reconfiguration. In fact, extensive reconfiguration may be done through automated methods under software control. In one embodiment, this also permits the addition of cells into a micro factory.

Figure 3A:
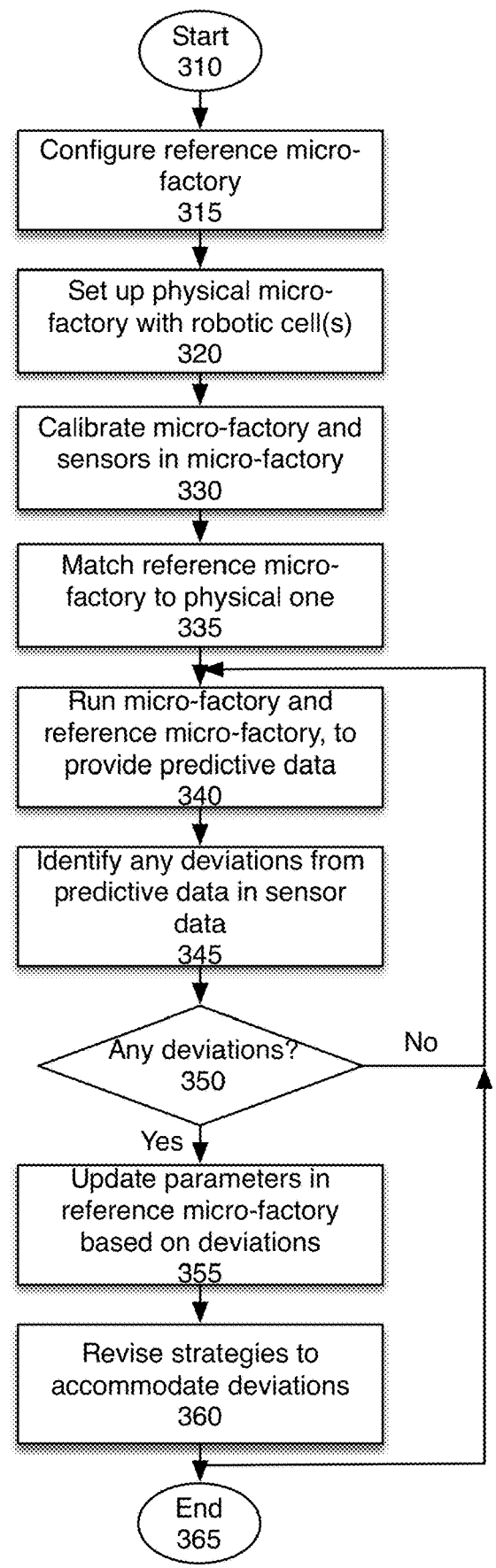
FIG. 3A is an overview flowchart of one embodiment of the present robotic micro-factory system.
Figure 3B:
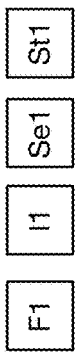
FIG. 3B illustrates one embodiment of reconfigurations of the micro factory lines.
Figure 3B:
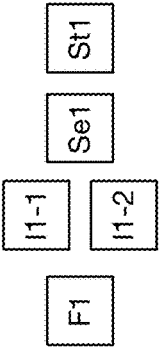
Figure 3B:
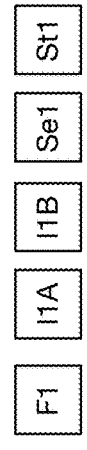
Figure 3B:
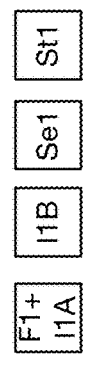
Figure 3B:
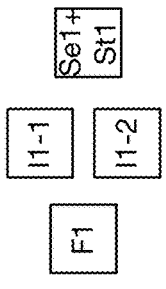

FIG. 3B illustrates one embodiment of reconfigurations of the micro factory lines. The initial configuration includes four cells, F1, I1, Se1, and St1, each executing a particular function. If there is a failure at one of the cells (here cell I1), or the system determines that the process is lagging at cell I1 (that is the process at I1 slows the through-put of the system), this may be addressed in various ways.

By enabling fast reconfiguration of a line of one or more robotic cells when a piece of hardware fails, the remaining systems (and potentially a spare) could be reconfigured to adapt—much like how a data center does to a server failure. This might require tool changers in the robotic cells and/or re-configurable conveyors that can route the products to the right cells. Such routing might utilize a main conveyor and a secondary conveyor that can bypass working cells. This conveyance would be "scheduled" or "controlled" by software.

If there is an available robotic cell, it may be configured to duplicate the functionality of cell I1, creating Cell I1-1 and Cell I1-2. The workflow can then split the product from F1 to one of the cells. Even if there isn't an additional "spare" robotic cell, another cell (or even a set of cells) that previously had a set of task(s) could take over the additional task(s) of the overloaded/broken cell. Those tasks could be moved to a single other cell, a single spare cell, or spread over multiple cells depending on the tasks of the overloaded/broken cell.

Effectively this removes the bottleneck or addresses the hardware failure by doubling the completion speed for I1. Alternatively, the functionality executed by Cell I1 may be split into two cells. This is useful when Cell I1 was lagging because it had two functions, and the relative timing of those functions works to be split. Alternatively, if there is not an additional robotic cell available, the functionality of cell I1 may be partially split to cell F1 (or cell Se1). Alternatively, if the timing is such that it would be more useful to have duplicates for cell I1, one of the other cells may be reconfigured to become I1, and the functionality of that cell may be assigned to an existing cell. In the example shown, Se1 can also provide the service of St1, creating a free robotic cell to be used for the addition of an extra I1 cell. Because the robotic cells are reconfigurable via software, this type of adjustment can be made once the micro factory is set up and running. This enables optimization of takt time for the micro factory. Additionally this ability to rapidly reconfigure a micro-factory, and auto-calibrate it, enables the micro-factory to be adapted for use for different products. Furthermore, remote deployment of recipes, a reconfiguration management system, and production analytics provide the backbone for a modular, configurable, reusable micro-factory which may be used for new product releases as well as small scale production. Because the production line may be distributed among more robotic cells, or production lines may be run in parallel, it also enables volume production.

Returning to FIG. 1, in one embodiment, robotic cells A10 include a local user interface A55, enabling interaction with the robotic cell A10 on the manufacturing floor. In one embodiment, the local user interface A55 may provide a joystick-based interaction, enabling direct control of the elements of the robotic cell. In one embodiment, the local user interface may include virtual reality controllers, detected hand gestures, or any other multiple-degree of freedom input device (mouse, 3d space mouse, etc.). In one embodiment, the local user interface A55 may enable direct manipulation of the robot arms by having a human physically manipulate them, when using a human-safe robot.

In one embodiment, in addition to the local UI A55 there may be a remote UI A50, coupled to the robotic cell A10 via a network A05. The remote user interface A50 may be a portable user interface, such as a tablet. The remote user interface A50 may be linked to the robotic cell A10 via a local area network (LAN), personal area network (PAN), or another type of network. In one embodiment, some remote UIs A50 may require proximity to a robotic cell A10, while other remote UIs A50 may be operable from anywhere. In one embodiment, the functionality and control elements presented on a user interface may vary based on one or more of the robotic cell A10, the configuration of the robotic cell A10, the identity/qualifications of the individual who is logged into the user interface, and proximity to the physical cell. In one embodiment, the local UI A55 and remote UI A50 provide identical base layouts and functionality, reducing complexity for the operators interacting with the robotic cells A10. In one embodiment, the user interface provides a unified human-machine interface (HMI) across all robotic cell types and configurations.

In one embodiment, for the production of an end product, the process starts with development tools A40. In one embodiment, these tools may be made available to designers remotely. In one embodiment, these tools may be provided online, through a Software as a Service (SaaS) type interface. In one embodiment, the development tools A40 enable the creation of recipes for robotic cells A10. In one embodiment, the development tools A40 enable the creation of a model, digital twin, simulation, design, and/or configuration of a manufacturing line including one or more robotic cells A10. In one embodiment, each robotic cell A10 has certain capabilities. The development tools A40 enable a user to create a manufacturing line using one or more of the robotic cells A10 to create the end product, and create recipes to configure and control the robotic cells A10. The development tools A40 in one embodiment may utilize data derived from CAD designs to convert high level commands to specific instructions. For example, a "fasten with screw" command may be translated to placing a screw at a position of the screw hole derived from the CAD data, which may have been generated by the system (block A60) or may have been imported.

In one embodiment, CAD/Design For Manufacture and Assembly (DFMA)/Optimization System A60 may be used. In one embodiment, design systems use data about the manufacturing capabilities of the robotic cells to create a CAD design, model, digital twin, simulation or other configuration for the end product to be made. In one embodiment, machine learning may be used. The machine learning might be based on one or more of: learning from prior projects and data, or simulations. The system may use feedback from the sensor data from robotic cells to further improve the DFMA and/or generative programming system. In one embodiment, the system may be trained with simulations of physics, e.g., synthetic training data. In one embodiment, generative adversarial networks (GANs) may be used to improve the quality of simulations and ML training. In one embodiment, a convolutional neural network (CNN) may be use for simulation and ML training.

In one embodiment, optimization methods may be used, to minimize the manufacturing steps and/or likelihood of design issues, based on the knowledge of the robotic cell capabilities. In one embodiment, when using CAD/DFMA/ optimization system A60 the system may take into account the manufacturing/assembly limitations of the robotic cells A10 in designing the end product. In one embodiment, the CAD/DFMA/Optimization System A60 may receive data from development tools A40 and may iterate the end product design based on issues identified through the development tools A40. In one embodiment, the output of the development tools A40 is a sequence of operations for each robotic cell in a manufacturing line.

The Design for Manufacture and Assembly A60 in one embodiment uses Machine Learning to improve the design. The machine learning system (ML) in one embodiment is based on learning from prior projects and data, or might be based on simulations, or both. The ML in one embodiment may be trained with simulations of physics rather than using real world data. This is referred to as synthetic training data.

Once a design is generated, translator A70 translates the sequence of operations to control commands for an individual robotic cell. In one embodiment, the output of development tools A40 is a recipe that has declarative commands, e.g. in a language which describes the configuration and actions taken by a robotic cell. Because each individual robotic cell includes multiple elements, which may utilize different control languages, the translation is quite complex. Furthermore, different robotic cells performing the same sequence of operations may have elements that are from different manufacturers or have different configurations. For example, a robotic arm may have two, three, or four movement joints, and the joints may have different limitations. Thus, a single command in the sequence of operations may be translated differently for each individual robotic cell.

The translated control commands may be applied to a virtualized robotic cell A75, also known as a digital twin simulation or "digital twin". The digital twin in one embodiment is a simulation run on a processor. In one embodiment, the processor may be a distributed processor, or any other computing platform which can support such a simulation. The virtualized robotic cell A75 may represent the individual configured robotic cell, and may be used for testing, and verification. In one embodiment, virtualized robotic cells A75 may use operational data A30 from physical robotic cells A10 to enable a user to view the actions of a physical robotic cell A10 remotely. In one embodiment, the operational data may be "live." A "live" view in one embodiment means live footage from cameras and other sensors, in real-time, reflecting the current status and actions of the robotic cell.

In one embodiment, a user may preview the robotic cell's actions during a process, may track the actions during the process, and/or review the actions after the process using virtualized robotic cells A75. In one embodiment, stepwise debugging can also occur while controlling the physical robotic cell. In one embodiment, the virtualized robotic cell may operate in slave mode, where the virtual robotic cell precisely tracks the actions of the physical robotic cell.

The output of the translator A70, once validated and verified, is stored as configuration data A25. The configuration data A25 is applied to physical robotic cells, as discussed above.

In one embodiment, a machine learning system A35 is used to provide data for iterative learning, and improvements to the process.

In one embodiment, although the elements here are shown as individual elements one of skill in the art would understand that the design tools A60, development tools A40, translator A70, virtualized robotic cells A75, and machine learning system A35 are implemented on one or more computer systems. The computer systems may be stand-alone devices, servers, or cloud-based systems which are accessed through network A05. In one embodiment, the elements described may be implemented on a single server system. In one embodiment, the elements described may be implemented on multiple unrelated computer/server systems. In one embodiment, though only a single block is illustrated for an element like development tools A40 the real tool may be distributed over multiple devices.

Figure 2:
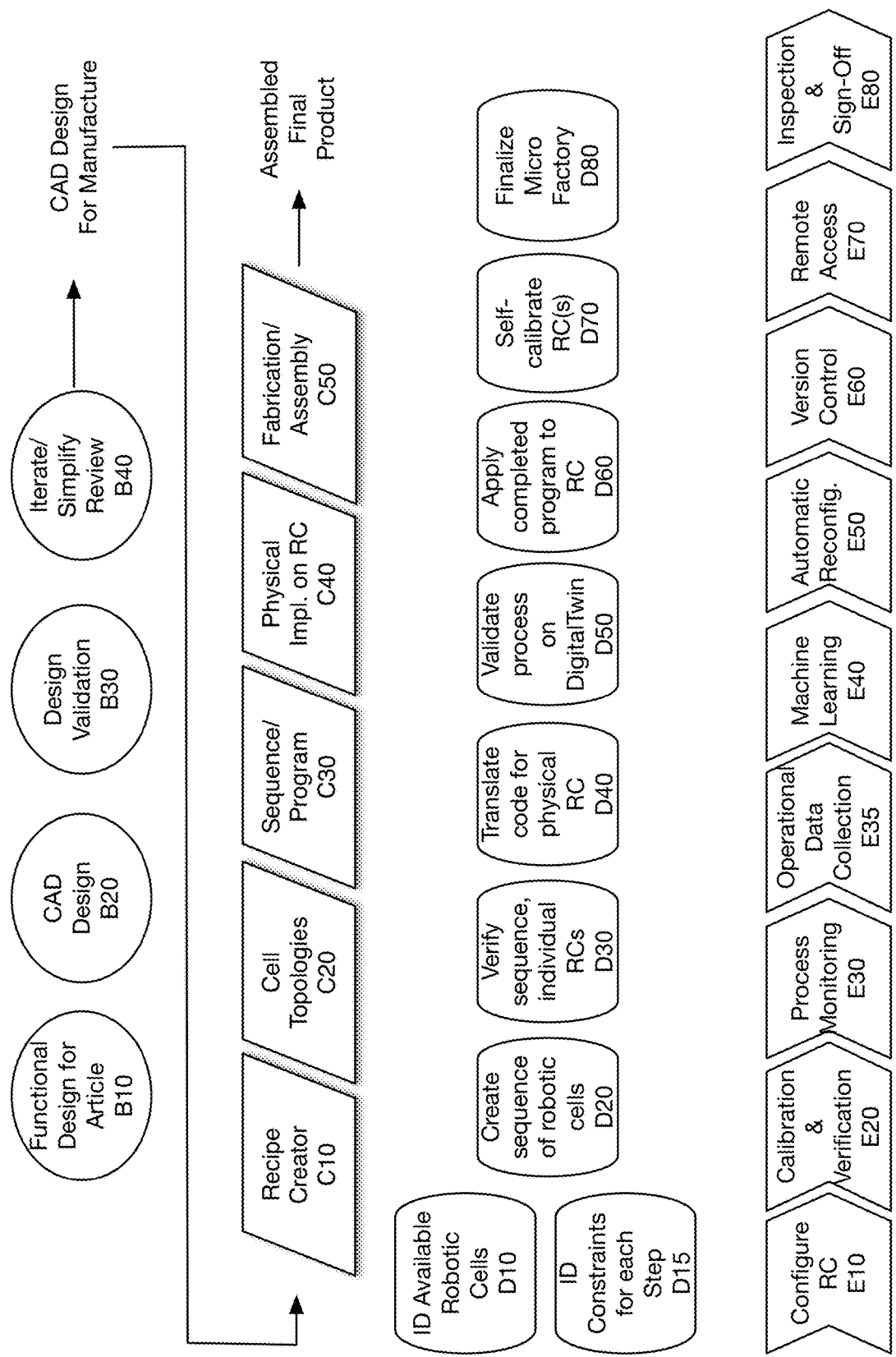
FIG. 2 is a simplified block diagram of the process which utilizes the micro factory comprising one or more robotic cells to create assembled final products.

FIG. 2 is a simplified block diagram of the process which utilizes the micro factory comprising one or more robotic cells to create assembled final products. In some embodiments, the robotic cells may be inserted into a traditional manufacturing line, to take over some sub-portions of the manufacturing. The process includes the layers of manufacturing, from recipe creation via recipe creator C10 to fabrication/assembly via micro factory C50. Although a complete process is shown, from initial concept/functional design through completed manufacturing, one of skill in the art would understand that the system may implement a subset of these processes and include a subset of these features.

In one embodiment, the system includes a design phase (row B), a production phase (row C), an implementation phase (row D), and a learning phase (row E). The design phase may start with the functional design for the article B10, followed by a CAD design B20, design validation B30, and iteration/simplification/review B40. The functional design B10 may in one embodiment include design-for-manufacture, in which automated design evaluates the manufacturability, in designing the configuration of the article. Design validation B30 ensures that the micro-factory can successfully build and/or assemble the article. The output of the design phase (row B) is a CAD design for manufacture.

Once the design is completed, the production phase (row C) is used. Recipe creator C10 creates a recipe for building the final product, based on the CAD design. The recipe creator C10 may be human-enabled, automated, or partially automated. Cell topologies C20 determines the configuration of the available cells in the micro-factory. Because different sites may have different cells (e.g. robotic cells with varied configuration elements), the cell topologies C20 account for the available configurations. The sequencing and programming of the cell C30 in one embodiment is performed on a digital twin representation of the micro-factory. The digital twin representation is a virtual representation of the cells and interconnections between the cells in a micro-factory. The digital twin representation, in one embodiment, is closely linked to the physical implementation such that, in one embodiment, the digital twin representation is adjusted continuously to match the real-world. This enables the system to provide design and testing on the digital twin. In one embodiment, this enables the build-out of a complete sequence to manufacture or assemble an article without access to the physical robotic cell. In one embodiment, the virtual micro-factory is also used to monitor the physical micro-factory. The virtual micro-factory representation provides feedback when the physical micro-factory is out of spec, as well as providing "live" views of the micro-factory remotely. A "live" view in one embodiment means live footage from cameras and other sensors, in real-time or in play-back mode, reflecting the current or prior status and actions of the robotic cell.

After the sequencing and programming, and associated debugging, optimization, etc. are completed, the program and hardware configuration settings are transferred to the physical implementation of each robotic cell in the micro-factory C40. Because the virtual representation mirrors the physical robotic cell, the program and configuration can then be used to fabricate/assemble the articles C50, producing the assembled final product. Of course, the assembled final product may undergo further assembly or manufacturing steps. However, the system in one embodiment, can be used to completely manufacture even complex articles, as will be described in more detail below.

The implementation phase (row D) illustrates one embodiment of the programming sequence (e.g. C20-C40) in more detail. In one embodiment, the implementation phase may start from available robotic cells D10 or from design constrains D15. A sequence of robotic cells is designed D20. This sequence is the micro-factory. In one embodiment, each robotic cell may be optimized to perform a particular sequence or process. In another embodiment, a robotic cell may perform multiple sequences or processes. In general, having each robotic cell perform actions, without needing reconfiguration, is more efficient. However, sometimes it is more effective to have a micro-factory with fewer robotic cells, one or more of which perform multiple processes. The sequence and individual robotic cells are verified D30, to ensure that each robotic cell in the micro-factory can perform the designed process(es). The code is then translated for the robotic cell D40. The translated process is validated on the digital twin implementation of the micro-factory. As noted above, because the twin is closely aligned to the physical robotic cell configuration, including calibration, the system can successfully validate the process on the virtual version of the micro-factory. Once validation is complete, the program is applied to the robotic cells in the micro-factory D60. In one embodiment, the robotic cells are auto-calibrated D70, and the micro-factory is finalized D80.

The learning phase (row E) illustrates the programmable aspect of the system. In one embodiment this process is part of the fabrication and assembly C50. The robotic cells in the micro-factory are configured E10. The calibration and verification E20 in one embodiment is continuous. There is initial calibration, and verification that the micro-factory is in proper configuration, and the system continuously monitors the micro-factory E30, to ensure that each robotic cell is still in the proper configuration. Operational data collection E35 collects real-time sensor data. This is used to ensure that the digital representation of the micro-factory remains accurate, and is also used to ensure that the micro-factory remains calibrated and accurate.

Machine learning and Self-Improvement System E40 utilizes data from micro-factories over time to improve the functioning of the micro-factory. This may include using machine learning in designing a process, based on data from prior designs. It may also include continuous quality improvement of existing designs. The continuous monitoring and self-improvement system can improve the configuration beyond what was simulated or designed. For example, the system may have been designed with an oven temperature of 300 degrees, but the system may discover that quality improves when the oven is at 303 degrees and quality may decrease at below 301 degrees or above 305 degrees. In one embodiment, the Machine Learning and Self-Improvement System E40 may experimentally make small adjustments to settings, to collect data about the effect of such adjustments on product quality, wear-and-tear, and other aspects of the system. This may be used over time to improve the design and optimize production configuration via testing iterative adjustments. This may be referred to as generative design. This type of closed-loop feedback optimization is enabled by the Machine Learning and Self-Improvement System E40.

In one embodiment, machine learning E40 may also be used to improve the design phase (row B), and implementation phase (row C).

Automatic reconfiguration E50 enables the robotic cells in the micro-factory to be updated, as needed. Version control E60 tracks each update to each robotic cell in the micro-factory. Version control E60 may be used to roll back updates, if the resulting change to the robotic cell or micro-factory is negative. It may also be used to ensure that changes are streamlined. It may also be used to rapidly reconfigure the micro factory to produce a different product, while retaining the ability to return to the current configuration and product at a later time.

Remote access E70 in one embodiment enables an authorized user to alter a micro-factory from a remote location. This is extremely useful, because it enables a skilled expert to make updates without being physically in the same location as the micro-factory. Inspection & sign-off E80 in one embodiment is the final step when a product is manufactured. The inspection & sign-off E80 provides feedback to the machine learning E40 and the user, if appropriate, verifying the quality of the micro-factory manufactured goods. In one embodiment, the inspection & sign-off may be done by an external system or person. One embodiment of the inspection process is described in co-pending application X, entitled "Improved Inspection Systems Using Machine Learning" (15000P0102) which is incorporated herein by reference in its entirety. The ability to take feedback from an inspection further enables the micro-factory to provide quality manufacturing, even on a small scale. Additionally in one embodiment the system includes inspection steps at various points in the manufacturing or assembly process, to detect fault earlier in the process.

FIG. 3A illustrates an overview flowchart of one embodiment of the system. The process starts at block 310.

At block 320, a micro-factory is set up, with one or more robotic cells. Each robotic cell may perform the same, or different processes, as described above. The cells may provide manufacturing, assembly, and/or inspection. There may be other parts of the manufacturing process which are not performed by the micro-factory as well.

At block 330, the robotic cells in the micro-factory are calibrated. In one embodiment, the entire micro-factory is calibrated in addition to the calibration of the individual robotic cells.

At block 340, the reference micro-factory is configured to match the physical micro-factory. The reference micro-factory in one embodiment comprises virtual representations of each of the robotic cells. These virtual representations of the robotic cells are configured to closely match the physical micro-factory configuration. In one embodiment, the reference micro-factory provides predictive information, by running the same recipe as the physical micro-factory. This enables the system to provide a virtual testing platform, as well as provide the ability to predict the precise actions of each robotic cell.

At block 345, the micro-factory is run. In one embodiment, the reference micro-factory is run in parallel, mirroring the physical micro-factory. In another embodiment, the reference micro-factory is run ahead of the physical micro-factory. In another embodiment, the reference micro-factory is run after the physical micro-factory and mirrors its past operation based on collected logging data to facilitate problem debugging. At block 350, the process identifies any deviations from the predictive data from the reference micro-factory in the physical micro-factory, based on the sensor data. Deviations include robot drift (e.g. a robot arm being in a place other than where it was predicted which can be caused by wear and tear, being bumped or otherwise moved, changes in temperature, hysteresis, backlash from a motion, or other causes of inaccuracies in the components of the robotic cell.

If there are no deviations, as determined at block 360, the process returns to block 345, to continue monitoring the system.

If there are deviations, the process at block 370 updates the parameters in the reference micro-factory based on the deviations.

At block 380, the process executed by the micro-factory (physical and virtual) are revised to accommodate the deviations. In one embodiment, the instructions to the robotic cell are updated, to accommodate the detected deviations. In one embodiment, the revision may be initially verified on the micro-factory before being rapidly deployed to the physical micro-factory.

The process then returns to continue monitoring the micro-factory. In one embodiment, by enabling the system to revise strategies to achieve an operational goal of the micro factory while accommodating deviations from normal operation, the micro-factory becomes resilient and enables rapid adjustment to account for real-world impacts on the micro-factory. Furthermore, as will be described below, the deployment of the updated process is rapid and can be remote. In one embodiment, change can also be rolled back. In this way, a resilient, easily deployed, and versatile system is built.

Although this figure, and though other figures in this utilize flowcharts to illustrate processes, the individual process elements do not need to be in the particular order shown, unless they are dependent, and elements may be executed in parallel or in any order if they are not dependent on each other. Furthermore, in one embodiment, various parts of the system may be implemented interrupt-driven elements, and checking may be continuous rather than at the end of processes.

Figure 4A:
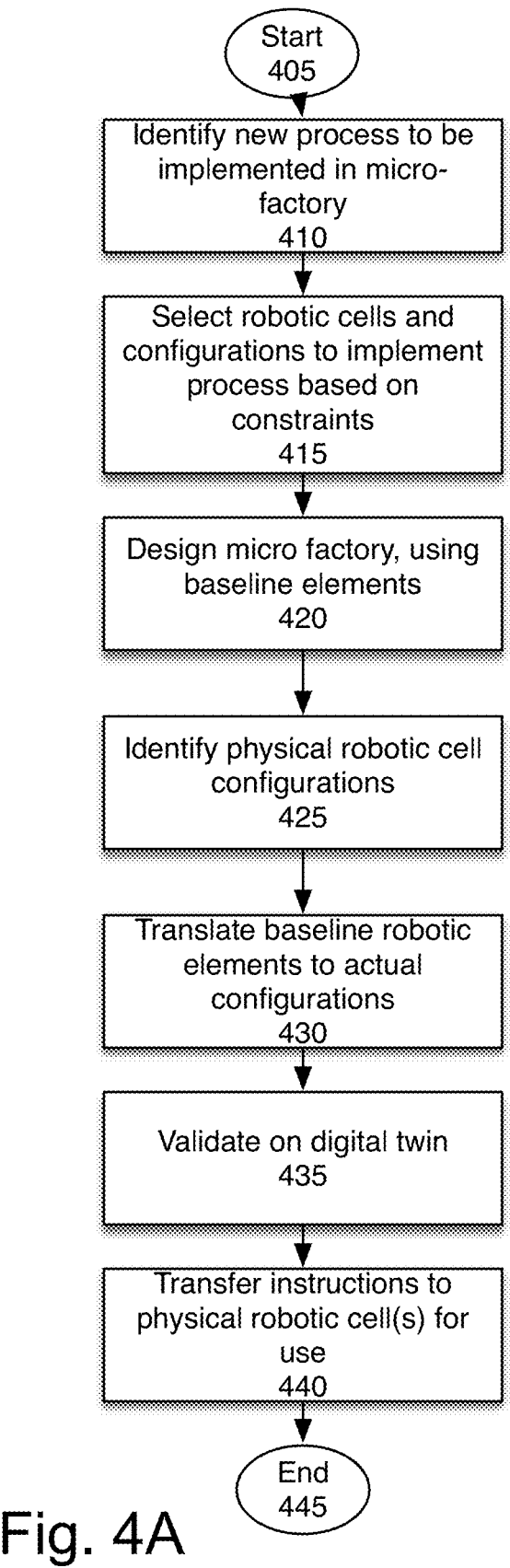
FIGS. 4A and 4B are flowcharts of two embodiments of moving from design concept to micro factory.
Figure 4B:
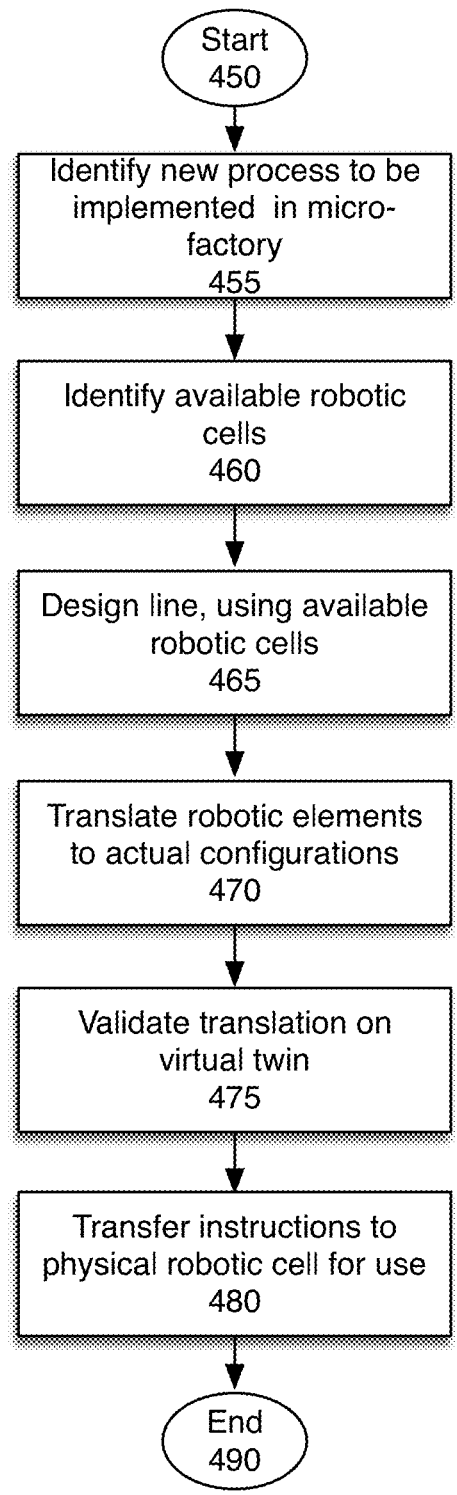

FIGS. 4A and 4B are flowcharts of two embodiments of moving from design concept to micro factory. In one embodiment, shown in FIG. 4A, the system may design the optimal process, based on other constraints such as manufacturing speed, budget, etc. In one embodiment, shown in FIG. 4B, the system may be based on the existing robotic cells available, for example when deploying a new process to an existing factory set-up.

FIG. 4A illustrates the embodiment for a new set-up. The process starts at block 405. At block 410, the new process to be implemented is identified. At block 415, the robotic cells and configurations are selected, based on constraints. In one embodiment, the constraints may include manufacturing time (e.g. the number of parts per time, or the time per part), cost (e.g. total budget for the process), space (e.g. how many robotic cells can be placed), tools available, and other constraints.

At block 420, the micro-factory is designed using baseline elements. Baseline elements include, in one embodiment, all available configurations for robotic cells. As noted above, robotic cells may include manufacturing cells, assembly cells, inspection cells, etc.

At block 425, the actual robotic cell configurations are identified for the micro-factory. The robotic cell configurations include, for example, for an assembly cell, the specific robotic arm, configured conveyor, tray feeders, and other elements which make up the full robotic cell.

At block 430, the baseline configuration is translated into the actual configurations. This includes designing the physical micro-factory configuration from the robotic cells.

At block 435, the design is validated on a virtual representation of the micro-factory, also known as a digital twin. The digital twin, in one embodiment, is designed to closely mirror (simulate) the real-world implementation. In one embodiment, the virtual micro-factory is a software representation of the sequence of one or more individual configured robotic cells, is used for testing, and verification. In one embodiment, the same recipe, or sequence of steps for performing the process, can be applied to the virtual micro-factory as the physical robotic cell(s) in the physical micro-factory, providing an offline/online programming environment. Therefore, the system can validate the process virtually.

After the process is validated, the instructions are transferred to the physical robotic cell(s) in the micro-factory for use, at block 440. The process then ends at block 445.

In the parallel process of FIG. 4B, rather than selecting robotic cells based on other constraints, the available robotic cells are identified, at block 460. The line is then designed using the available robotic cells. For example, if there is only one robotic cell with a robotic arm, that single robotic cell may perform all of the assembly steps which require a robotic arm (e.g. inserting the heat sink, putting in screws, etc.). In one embodiment, the line may reroute through a single robotic cell multiple times. Furthermore, in one embodiment, the design takes into account the time to change the tools in a robotic cell, and designs the process to maximize the manufacturing speed and/or minimize hardware costs.

Figure 5A:
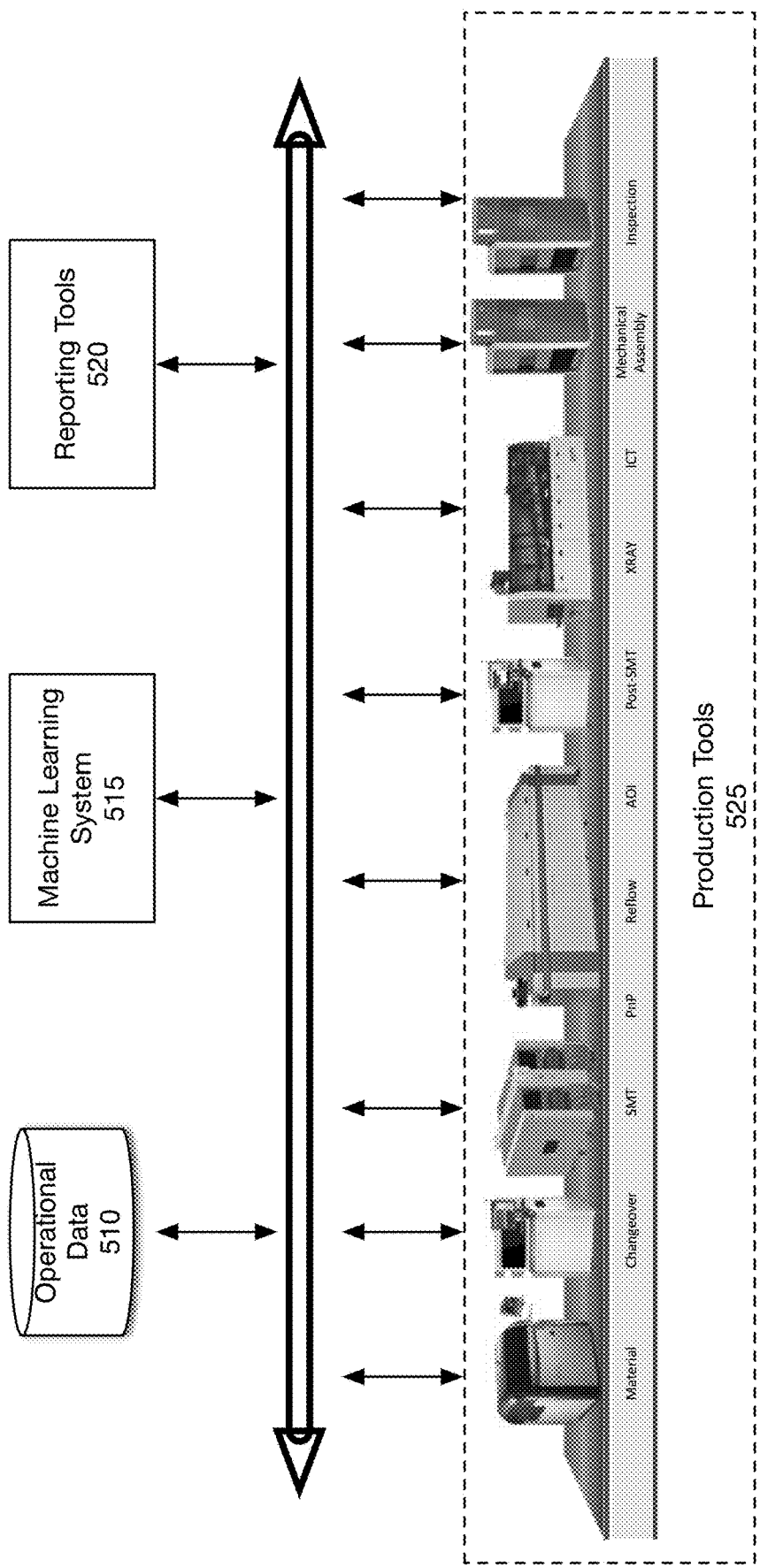
FIG. 5A illustrates one embodiment of a mixed factory system in which there are elements of the micro factory, providing mechanical assembly and inspection, and elements from traditional factory assembly lines.

FIG. 5A illustrates one embodiment of a mixed factory system in which there are elements of the micro factory, providing mechanical assembly and inspection, and elements from traditional factory assembly lines. The production tools 525 illustrated include a variety of devices used in the complete manufacturing of a product. These devices may all be robotic cells, in one embodiment. In another embodiment, the micro-factory may replace just one of the functions shown in the production tools 525. For example, a micro-factory may perform the mechanical assembly using one or more robotic cells.

In one embodiment, one or more of the production tools 525 are software controlled. In one embodiment, for software controlled tools, operational data 510 is used to control the tools. In one embodiment this includes uploading new recipes (processes), adjusting controls, etc. Data from the software controlled tools also flows into operational data 510. In one embodiment, the two sets of data may be separate The operational data 510 in one embodiment includes sensor data from the software controlled tools, showing the precise operations, configurations, and steps executed by the tool.

Machine learning system 515 utilizes the data from the production tools 525 to configure, correct, and manage the production tools. The machine learning system 515 in one embodiment also is used in designing subsequent iterations or different micro-factories. The system collects data from the robotic cells, including data from cameras and sensors. This data may be used in machine learning. For example, as the data from robotic cells is collected, the system can learn how much torque or pressure is optimally used in certain actions, robot arm compensation, optimal order of operations, vibration and temperature during operation, and how these factors impact the process. Additionally data may include the difference between the execution time in simulation and real execution, etc. This data is provided to the machine learning system, which can project forward to determine how to improve the design and layout of micro-factory.

Reporting tools 520 provide the interface elements which enable a supervising user to see the process. In one embodiment, the reporting tools 520 provide visual representations of the operational data 510, and the sensor data. In one embodiment, the reporting tools also may provide suggested reconfigurations or adjustments to a micro-factory, when appropriate.

Figure 5B:
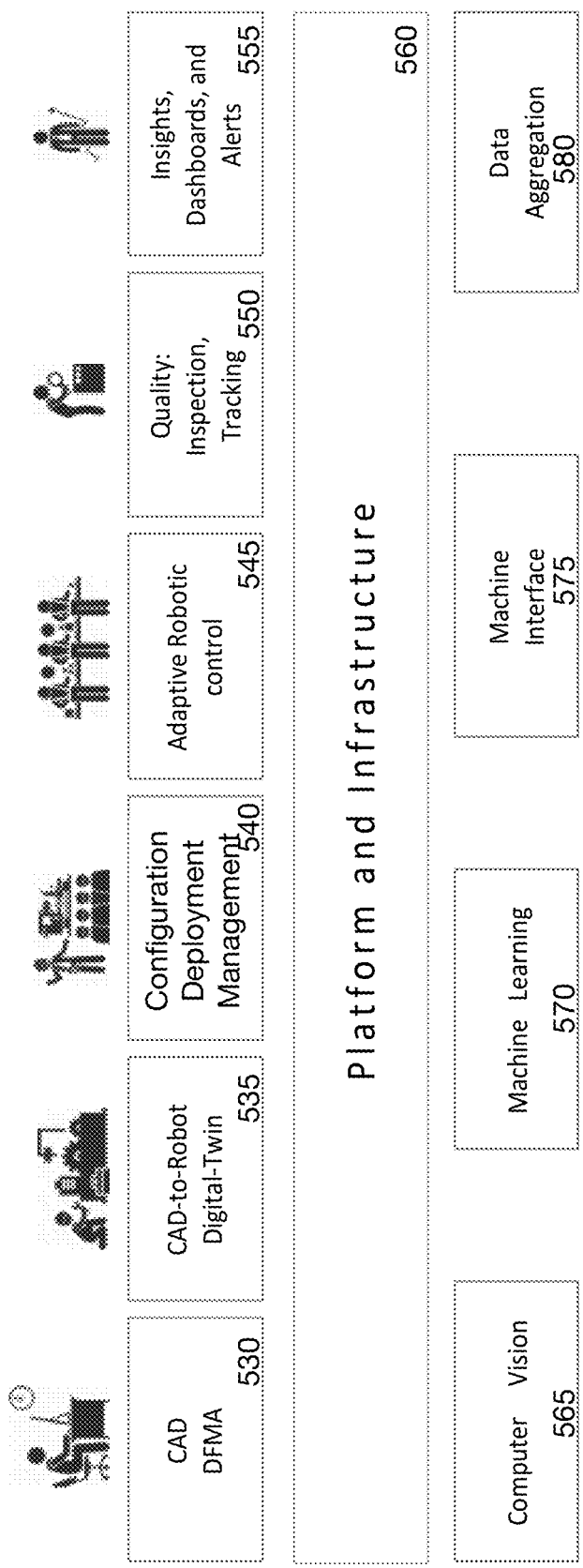
FIG. 5B illustrates one embodiment of a software defined manufacturing process, showing a user facing interfaces, a developer facing platform and infrastructure, and core technology elements underlaying the system.

FIG. 5B illustrates one embodiment of a software defined manufacturing process, showing user facing interfaces, a developer facing platform and infrastructure, and core technology elements underlaying the system. Software defined manufacturing (SDM) is a manufacturing ecosystem that can be automated by software or where software performs functions previously requiring hardware (ex. computer vision replacing the need for precise jigs). The benefit of SDM is the ability to have quick and cheap re-configuration, to solve a different problem without the high costs of human customization. Software automating the hardware, replacing the need for some hardware, and making hardware more adaptable to new situation defines SDM. This ability to define and control the functionality of hardware via software is provided in the present system.

Underlying all of these aspects is a platform and infrastructure 560 that provides an intermediary layer between the tools and the device layer. In one embodiment, the platform and infrastructure 560 is supported by computer vision 565, machine learning 570, machine interface 575, and data aggregation tools 580. The computer vision 565 enables calibration and tracking of the robotic cell. Machine learning 570 enables the system to learn from use, for calibration as well as for efficiency and effectiveness. Human machine interface 575 enables a technician to interface with physical robotic cells, create recipes, and monitor the robotic cells. Data aggregation 580 collects and logs data from cameras and other sensors in the robotic cell, for training, tracking the effectiveness of the current recipe, as well as machine learning.

A recipe in one embodiment is the sequence of commands sent to a robotic cell to execute one or more actions. A recipe may be static or dynamic, simple or complex. A simple static recipe may be "move conveyor at time X by Y inches." A complex recipe may include obtaining data from a camera, and conditionally inserting a screw, if a part is configured correctly. A recipe may include an entire assembly process, or a step in a process.

On top of the platform and infrastructure 560 in one embodiment the system has a computer aided design (CAD) interface for design for manufacture and assembly (DFMA). In designing a device to be manufactured or assembled, the system takes into account the limitations and capabilities of the micro-factory. For example, shifting the position of a screw may make a manufacturing process much simpler. Because the capabilities of the robotic cells in the micro-factory are known, the design process can take these capabilities into account. Because this is an integrated holistic system, the design phase is integrated, in one embodiment. Thus, in one embodiment, the machine learning system, learning from the micro-factory productions, can determine the optimal configurations of various elements of a product, prior to design. DFMA in one embodiment, may start with initial requirements, and the process may identify specific element configurations that are most efficient for the micro-factory. This enables the system to optimize the product or project design for the robotic cell manufacturing, assembly, and/or inspection. By altering some of the features of a product design, the product can be made easier, cheaper, and more accurate to manufacture or assemble.

CAD-to-Robot 535 extracts manufacturing features from a CAD design, to enable implementation on a robotic cell. Digital twin 535 is a virtual representation of each robotic cell, and in one embodiment the micro-factory. The translation in one embodiment, produces a recipe, or sequence of actions, to produce the design. Once a recipe is made, it can be tested on a virtual version of the robotic cell(s), or a digital twin. Because the digital twin is a representation of the exact configuration of a robotic cell, the entire process can be tested on a digital twin. Furthermore, in one embodiment, data from the digital twin provides predictive data for the robotic cell, enabling the system to compare the actual configuration with the virtual representation, and addressing discrepancies before they cause issues. The virtual representation, in one embodiment, may be used for testing, and verification.

In one embodiment, a digital twin uses operational data from physical robotic cells to enable a user to view the actions of a physical robotic cell remotely. In one embodiment, a user may preview the robotic cell's actions during a process, may track the actual actions during the process, and/or review the actual actions after the process using virtualized robotic cells. In one embodiment, one or more virtualized robotic cells may also be assembled into a virtualized micro-factory, enabling the user to plan, test, and monitor the physical micro-factory.

Configuration and deployment management 540 enables the system to track configuration changes and approvals, and deploy recipes and other configuration (software, settings, operating systems, drivers, etc.) to robotic cells in a micro-factory, and manage the configuration and reconfiguration of the robotic cells. Configuration encompasses every aspect of the robotic cell that enables the restoration of the hardware operation to a particular state. This includes hardware settings, recipes, software programs, device drivers, operating systems, etc.

Configuration management tracks configuration changes and approvals, and deployment management uses a configuration from the database and deploys that configuration onto all the different hardware parts and settings in a robotic cell. Configuration management, in one embodiment, provides a workflow for tracking configuration changes, and approvals for deployment. In one embodiment, the approvals may involve various people inside and/or outside the company, who approve a deployment, or a roll-back of a configuration. In one embodiment, of a deployment may include elements deployed automatically (e.g. settings and software) and elements deployed by alerting a user to make a change (e.g. replacing a hardware element, flipping a switch, etc.) In one embodiment, the configuration management system may track configuration aspects which utilize user action, and provide alerts to take those actions, based on changes to the configuration.

Unlike in traditional manufacturing ecosystem, in a software controlled manufacturing solution, the deployed configuration state (ex. device settings, software, etc.) can be reverted, if the system determines that a change is problematic. In one embodiment, configuration and deployment management 540 also enables monitoring of the effect of changes to the code or configuration, and rolling back changes if needed.

Furthermore, in one embodiment configuration and deployment management enables the pushing out and testing of changes to a subset of the total production line. In one embodiment, the system may for example have an identified and tracked set of product serial numbers where proposed (either by human or software automation means) configuration changes are tested against one or more process steps, cells, production lines, or multiple production lines, and once validated, to the main production of subsequent products. In one embodiment, this enables the above discussed generative design of automatically making small changes, monitoring their impact on the system, and over time improving the design through a machine learning and self-improvement system. In one embodiment, deployment may be cloud managed, enabling remote deployment and simultaneous distribution across multiple production lines.

Adaptive robotic control 545 translates manufacturing recipe instructions from an abstract, high-level (ex. "declarative"), device-independent language into the procedural device-specific language required by the physical hardware present. In another embodiment adaptive robotic control allows a manufacturing recipe (or program) designed for the specific requirements (dimensions, coordinates, etc.) of one cell or multi-cell micro-factory to be deployed to a similar but different cell or micro-factory via translation and/or automated calibration.

In one embodiment, adaptive robotic control 545 also provides the ability for the robotic cell to adapt to similar cases with no or minimum expert guidance. In general, in the prior art, a teach pendant is used, in which an operator utilizes buttons on the teach pendant to move the robot through its steps, saving each position individually. However, this is time consuming and requires an expert operator. Adaptive robotic control 545 enables robotic cells to autonomously achieve new tasks, without manually programming. The idea is to derive data from programmed actions and templates, and adapt those goals and actions to similar cases.

In one embodiment, the adaptive robotic control 545 provides a form of automatic programming, or generative programming, derived from data extracted from a computer aided design (CAD) system describing the product, and/or a simulation system. For example, for a recipe that says "attach with screw," the automatic programming may extract screw hole coordinates from CAD drawings or CAD models and automatically generate a manufacturing recipe that instructs a robot to acquire a screw from a screw presenter location, travel to the screw hole location (optionally based on computer vision), and engage the screwdriver tool.

Inspection and tracking 550 is used to ensure that the products manufactured and/or assembled by the micro-factory meet the specifications, and are of high quality. Inspection includes final inspection, after a process is complete as well as in-process inspection, as discussed above.

Inspection and tracking in one embodiment includes an integrating debugging system. The integrated debugger utilizes logged data from a physical robotic cell in providing remote live debugging, playback, and simulation based debugging. Remote live step-by-step debugging, in one embodiment utilizes the logged sensor data, which includes camera data, recipe data, other sensor data, and displays the data on the digital twin in near real-time to provide a "view" of the robotic cell remotely, for step-by-step execution of a recipe and debugging. Replay debugging enables the system to replay a process, or portion of a process for debugging on the digital twin. This enables "rewinding" a process to observe what occurred before a fault or other unexpected event, as well as observation of the entire process. Simulation debugging enables debugging of recipes and settings using the digital twin.

In one embodiment, the feedback from inspection and tracking may be used by configuration management system 540 to validate or revert changes, and by the machine learning system 570. In one embodiment, inspection and tracking is part of the micro-factory, or uses external inspection systems, to verify and test the product manufactured and/or assembled. In one embodiment, the inspection and tracking system uses data from the sensors in the robotic cell to perform in-process inspections. This is used to find defects early in a product's assembly process thereby avoiding further investment into that rejected assembly and directing it to scrap or a rework station.

The user interface 555 provides insights, dashboards, and alerts. In one embodiment, the user interface 555 provides a set of dashboards to the micro-factory user, with a different set of interfaces based on the identity of the user. For example, a user working on a particular robotic cell may have a different interface and dashboard than a user overseeing a production line. The user working on a particular robotic cell, for example, may receive immediate alerts if the robotic cell has an issue. In contrast, the user overseeing the production line may see production rates, error rates, and similar data. In one embodiment, cumulative data form many micro-factories is used to train the machine learning system 570, update the CAD/DMFA system 530, and upgrade the recipes and/or robotic cells as new insights are gained.

Figure 5C:
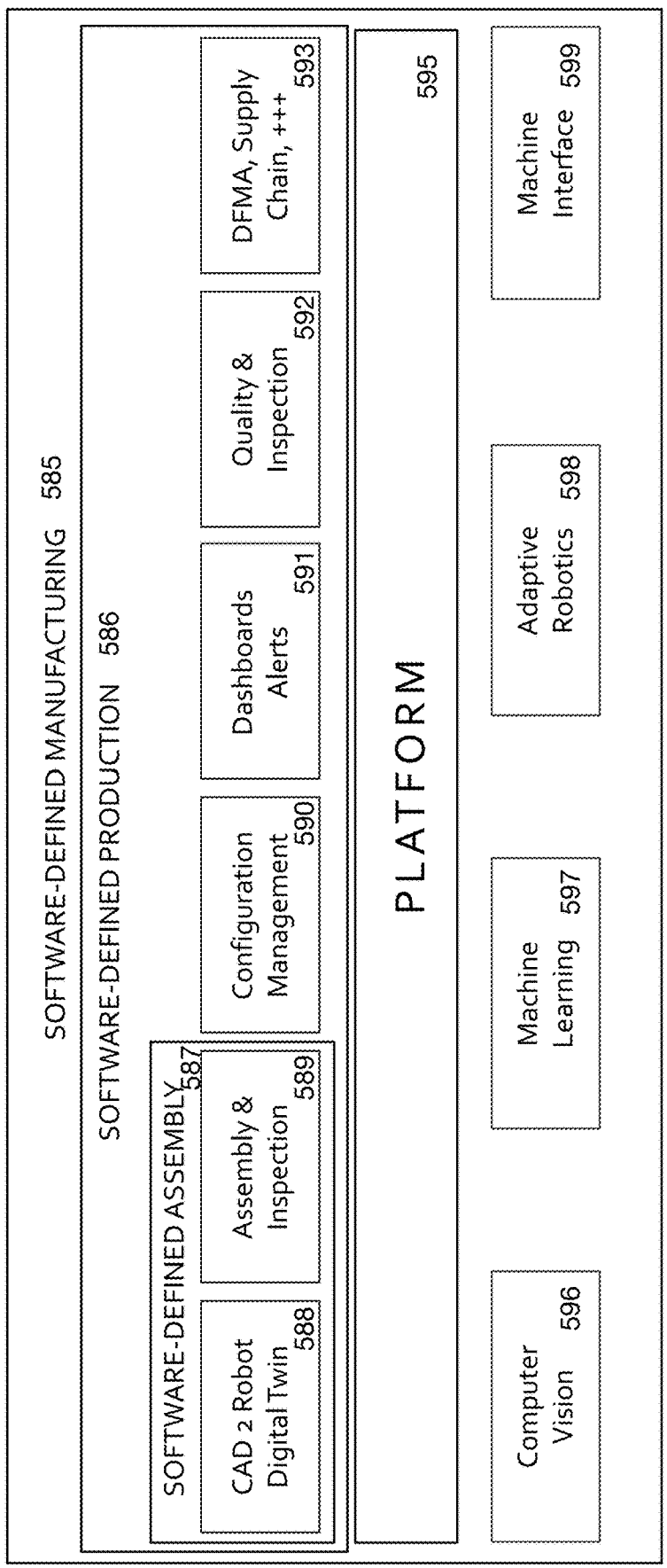
FIG. 5C is a block diagram of one embodiment of the elements of a software defined manufacturing system.

FIG. 5C is a block diagram of one embodiment of the elements of a software defined manufacturing system. The software defined manufacturing system 585 includes software-defined production 586. Software defined production 586 includes software-defined assembly 587, which includes CAD to Robot, and Digital Twin 588, and assembly & inspection 589. Configuration management 590 provides the ability to manage, track, secure, log, and deploy configuration data to physical robotic cells, and roll back configuration updates, when needed. Dashboard alerts 591 in one embodiment include alerts to various users, about issues with the micro-factory. Quality and inspection 592 provides the review of the product from the micro-factory, and verification that the micro-factory is functioning as intended. Various other elements may include DFMA, Supply change management, etc. The platform 595 as noted above is supported by computer vision 596, machine learning 597, adaptive robotics 598, and human machine interface 599.

Figure 6:
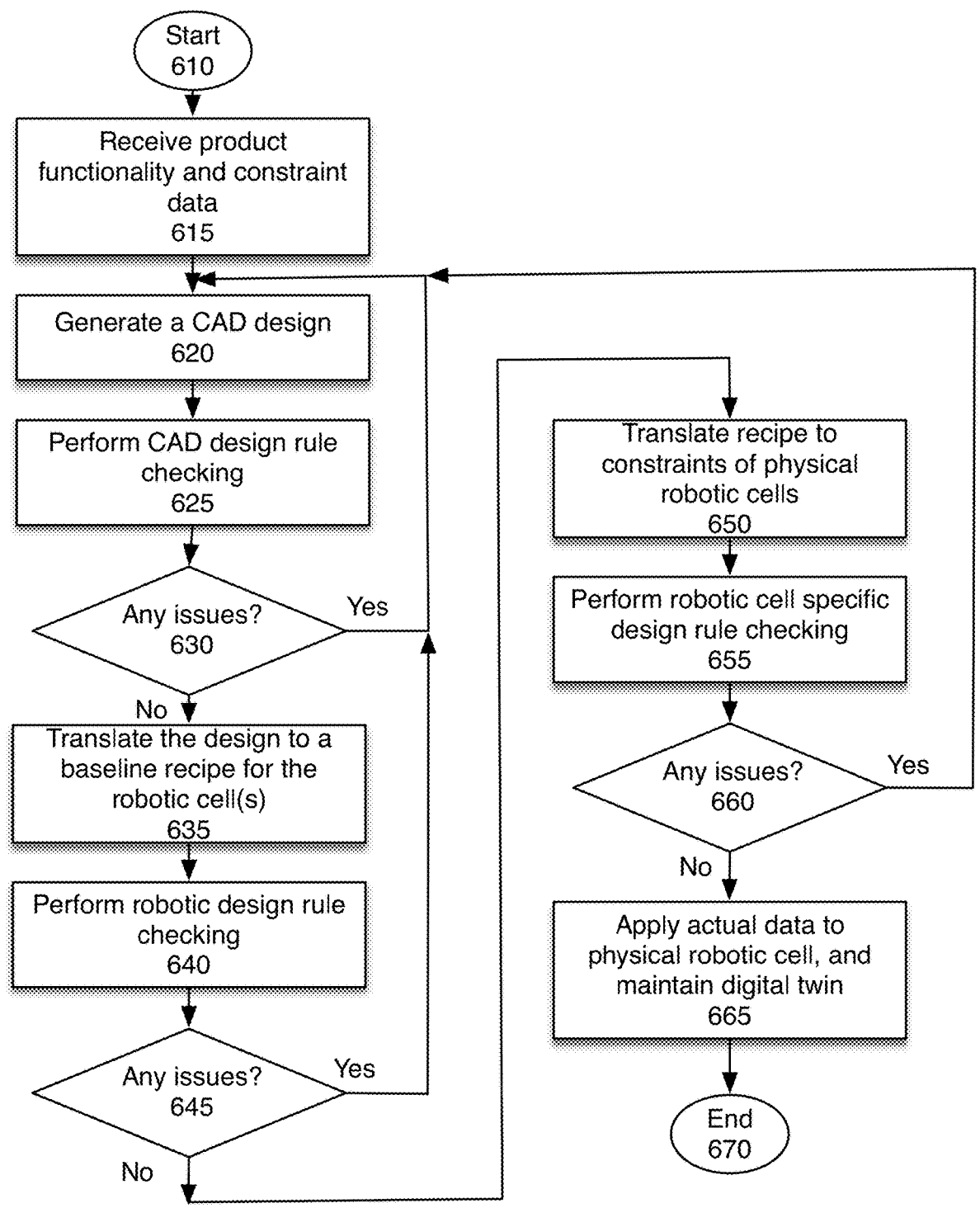
FIG. 6 is a flowchart of one embodiment of design for manufacture and assembly (DFMA).

FIG. 6 is a flowchart of one embodiment of design for manufacture and assembly (DFMA). The process starts at block 610.

At block 615, the system receives product functionality and constraint data. This may be for example a functional definition, or a definition based on function and dimensions.

At block 620, a CAD design is generated. The CAD design, in one embodiment, may be automatically generated. In another embodiment, a designer may be involved in generating the CAD design.

At block 625, CAD design rule checking is performed. The CAD design rule checking ensures that the design is manufacturable. For example, there are certain types of shapes that cannot be made in a CNC machine. If the design is made for manufacture in a CNC machine, then the design rule checking ensures that the machine can manufacture, and assemble, the pieces. At block 630, the process determines whether there are any issues with the design. If so, the process returns to block 620 to regenerate the CAD design to ensure compliance. This process, in one embodiment, may be iterated multiple times until the CAD design rules are passed.

If there are no issues, at block 635, the system translates the design to a baseline recipe for the robotic cells. The baseline recipe may be high level, e.g. "put in screw" or "place DIMM module into socket," etc.

At block 640, the process performs robotic design rule checking. The robotic design rule checking ensures that the robotic cells can perform all of the actions in the recipe and that all actions are allowed by policy. In one embodiment, this may be based on a general set of rules for robotic cells. For example, a screw which has a narrow entrance generally cannot be tightened by a robotic screw driver, because a standard screw driver cannot be fit into that space. Or an assembly step which requires six pieces to be simultaneously fit, may not be possible in a robotic cell. The robotic design rule checking verifies that there are no actions which cannot be executed by the robotic cell(s). A design rule may prevent an operation by policy such as an operation that is technically possible, but which might result in unacceptable quality. For example, drilling a hole in a fiberglass board very close to the edge of the board which might result in a mechanical crack.

If there are any issues, as determined at block 645, the process returns to block 620 to regenerate the CAD design. In one embodiment, the system may also examine the recipe to determine whether there are other, executable commands which may replace the commands that violate the robotic design rules. If there are no issues, the process continues to block 650.

At block 650, the process translates the recipe to the actual robotic cell(s) on which the process will be implemented. While the hypothetical robotic cell or micro-factory has a range of possible uses, the actual robotic cell(s) available further constrain the system. For example, if the robotic cell has a gantry arm, there are certain movements which cannot be made. Thus, the recipe is translated to the constraints and capabilities of the actual robotic cell configurations. At block 655, the system performs robotic cell or other hardware specific design rule checking.

At block 660, the system determines whether there are any issues. If so, the process returns to block 620. Otherwise, the process continues to block 665.

Figure 7A:
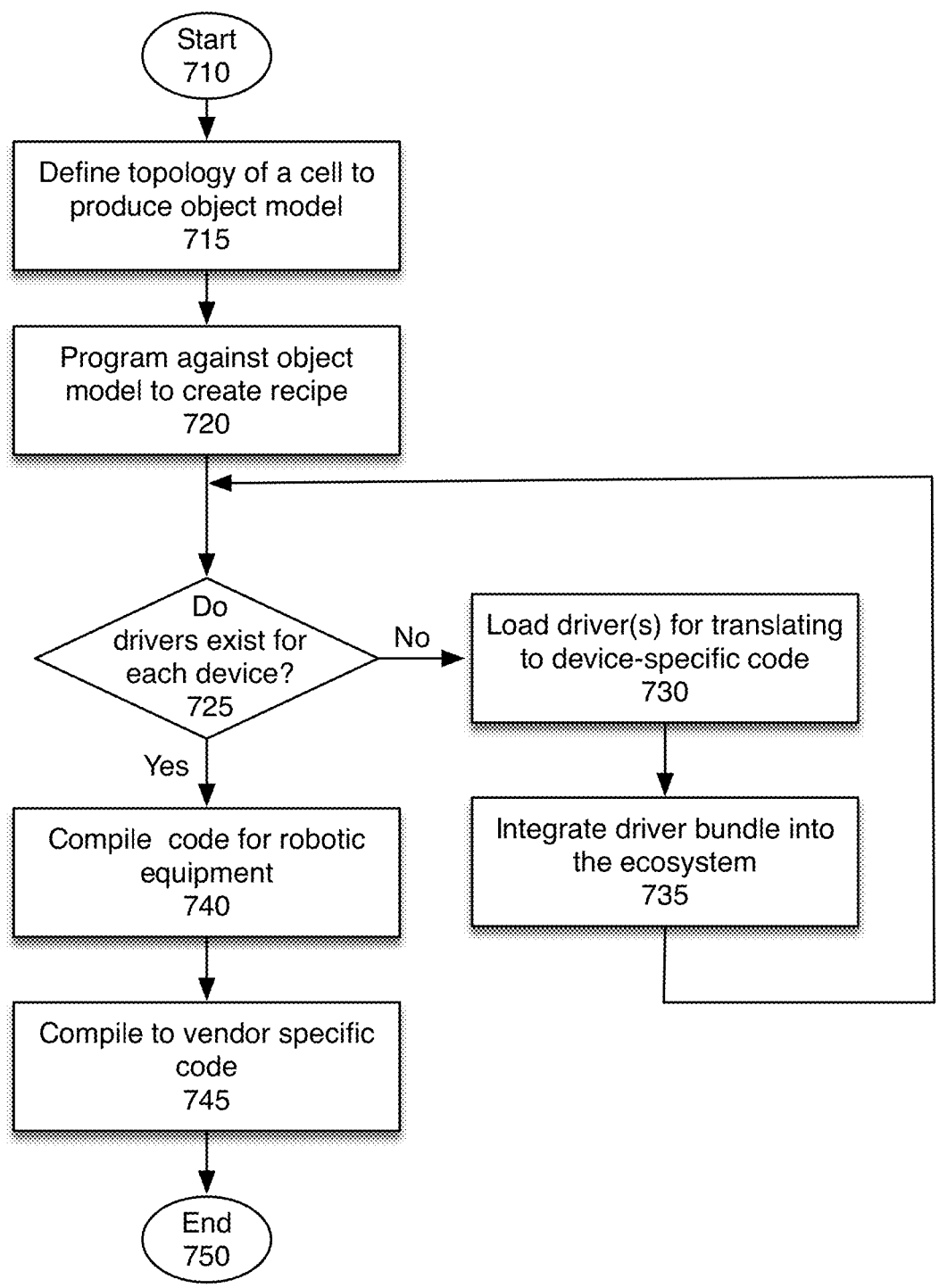
FIG. 7A is a flowchart of one embodiment of utilizing a device agnostic recipe-based approach.

At block 665, the robotic data is applied to the digital twin and the robotic cell(s). At this point, the system may validate the process using the digital twin. The system may them utilize the robotic cell(s) to actually manufacture the item. In another embodiment, once the process is validated, the instructions are stored. These instructions may be used The process then ends. In another embodiment, as will be described below, the recipe is built based on the robotic cell's constraints, and thus the system does not need to separately check the robotic design rules, since the constraints of the programming environment ensure that the recipe complies with the constraints of the robotic cell. FIG. 7A describes this approach.

FIG. 7A is a flowchart of one embodiment of utilizing a device agnostic recipe-based approach. The process starts at block 710.

At block 715, the topology of the cell is defined, to produce an object model. An object model is a representation of a robotic cell, including its constraints and capabilities.

At block 720, a user is able to program against the object model. In one embodiment, this ensures that the recipe (or program) created by the user matches the constraints of the robotic cell.

At block 725, the process determines whether drivers exist for each device. A robotic cell generally includes multiple devices, ranging from cameras and sensors to a robotic arm, end of arm tools, conveyor belt(s), etc. The system determines whether the programming environment has the drivers for each of the devices which are in the robotic cell. If not, at block 730, the system loads the drivers for translating the recipe to each particular device. This is used to translate the recipe to the device-specific code. The system integrates the driver bundle into the ecosystem at block 735, and returns to block 725, to ensure that all drivers are available.

Once all drivers are available, at block 740 the code is compiled for the robotic equipment. In one embodiment, the resulting code translates the high level recipe to robotic instructions. For example, a high level recipe may be "tighten screw" whereas the compiled code may be "rotate screw driver with force X, by 90 degrees."

At block 745, the code is compiled to the vendor specific code. Each vendor provides its own specific interface for the elements in a robotic cell. Thus, the system compiles the robotic instructions to specific code that can interface with the particular part(s). The process then ends at block 750. This process enables the robotic cells to be heterogeneous, utilizing elements from multiple vendors, with different vendor specific code. It also enables the generation of a single recipe which can then be translated to instructions for a variety of robotic cells. The ability to utilize robotic cells which are not all uniform extends the usability of the present system, by giving it more flexibility. Furthermore, it means that if a better quality (or price or capability) element becomes available, changing that element in the robotic cell does not require reworking all of the recipes. Rather, when a new element is added, the robotic cell can be upgraded, the system can obtain the drivers for the new element, recompile the code, and quickly be back online.

Figure 7B:
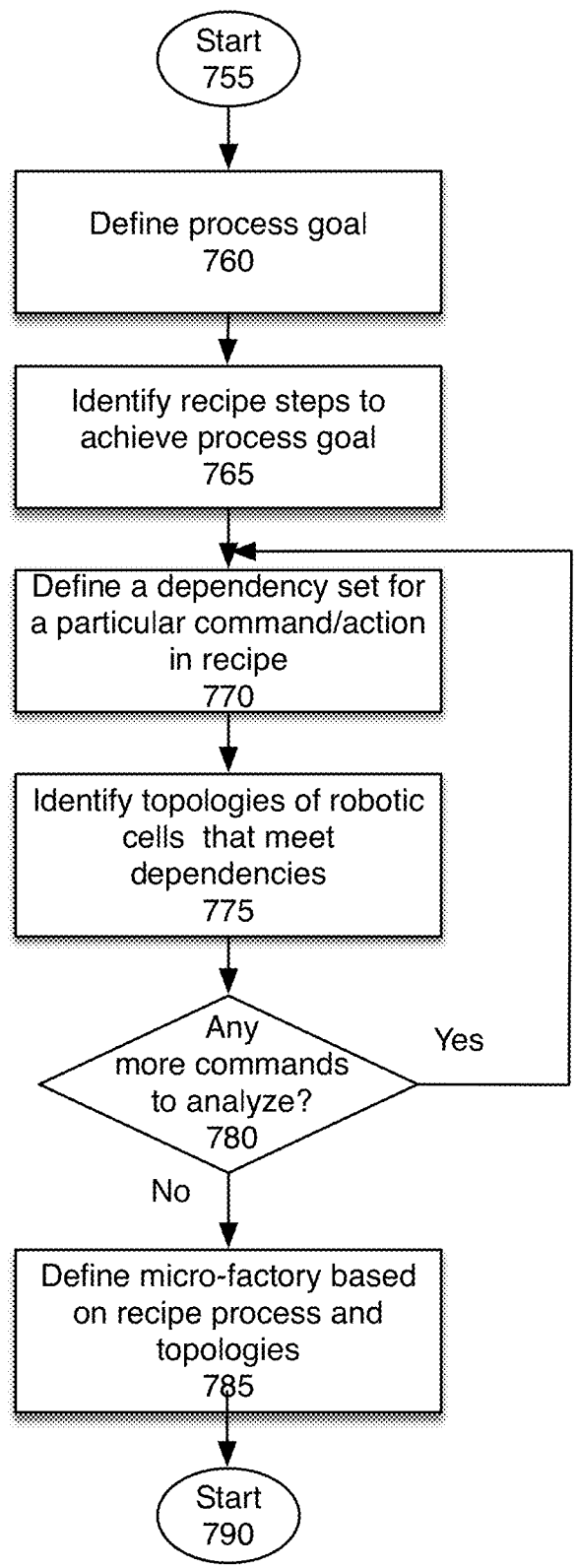
FIG. 7B is a flowchart of one embodiment of a micro-factory definition based on the article to be manufactured or assembled.

FIG. 7B is a flowchart of one embodiment of a micro-factory definition based on the article to be manufactured or assembled. The process starts at block 755.

At block 760, the process goal is defined. The process goal may be to manufacture an object, to assemble an object, and/or to inspect an object.

At block 765, the recipe steps to reach the goal are identified. The recipe steps include actions taken by each robotic cell in a micro-factory. This may include actions by robotic arms, end of arm tools, conveyors, trays carrying work pieces, or other elements in the micro-factory.

At block 770, a set of dependencies is identified for a particular command or action in the recipe. The dependencies include the set of needed sensor data, the set of needed motions, the set of needed previously completed steps. For example, for an action "tighten screw" the dependencies may include having a work piece in place, with a screw placed in a screw hole, a robot arm with a screw driver end-of-arm tool, and sensors for controlling the rotation and force used by the screw driver.

At block 775, the process identifies the topologies of the robotic cells that meet the dependencies. The robotic cell for the above example of tightening a screw, would need to have a screw dispenser, a screw driver end of arm tool, a force sensor, etc.

At block 780, the process determines whether there are any more commands to analyze in the recipe. If so, the process returns to block 770 to analyze the next command or action.

At block 785, the micro-factory is defined based on the topologies and commands in the recipe. In one embodiment, there may be multiple possible definitions, based on other constraints such as speed of assembly, the number of available robotic cells for the micro-factory, etc. In one embodiment, the system initially constrains this design based on the number of available robotic cells, and then optimizes on that basis for the shortest takt time. The process then ends at block 790. This process enables optimization of micro-factory design based on the constraints due to the recipe being implemented, the available robotic cells, and any other constraints. In one embodiment, for example, a complex recipe may be implemented on a single robotic cell which can change its end-of-arm tool to take every action in a recipe. Of course, this takes longer than having each robotic cell take one action, without having to change end-of-arm tools. This flexibility enables a recipe to be implemented in a variety of environments, with a variety of constraints.

Figure 8:
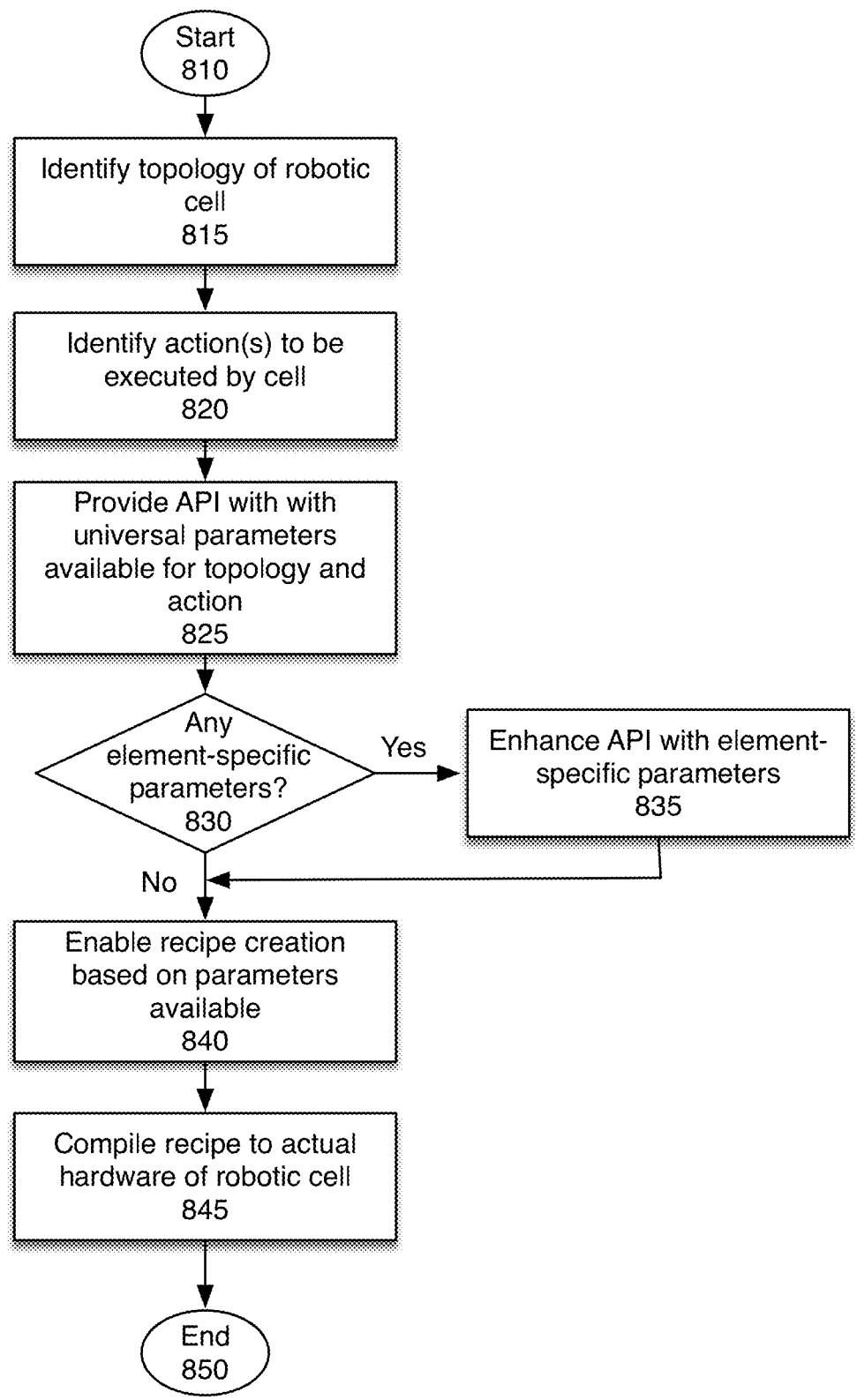
FIG. 8 is a flowchart of one embodiment of utilizing driver abstraction to enable smart recipe creation.

FIG. 8 is a flowchart of one embodiment of utilizing driver abstraction to enable smart recipe creation. The process starts at block 810.

At block 815, the topology of the robotic cell is identified. The topology of the robotic cell defines the elements within the robotic cell.

At block 820, the action(s) to be executed by the cell is identified.

At block 825, an application programming interface (API) is provided with the universal parameters available for the defined robotic cell parameters, and actions. The API enables the user to specify the values for the various aspects of each of the actions in the recipe to be executed. For example, for an action of "tightening the screw" the values may include the position of the screw, the angle that the screw driver is rotated, and the speed of rotation.

At block 830 the process determines whether there are any element-specific parameters. If so, at block 835, the API is enhanced with the element specific parameters. Element specific parameters include for example the range of torques for the screw driver, the availability (or lack of availability) of a force feedback sensor, etc. The system enables the user to control these element specific parameters via their code.

At block 840, the system enables recipe creation based on the available parameters. Thus, for a system that does not provide force feedback, the recipe does not rely on force feedback data. Whereas if the system includes force feedback, that may be an input to the control system.

At block 845, the recipe is compiled to the actual hardware of the robotic cell. As noted above, this may then be used on a digital twin of the robotic cell for validation and testing. It may also be deployed to the actual robotic cell. It may also be saved, and made available in a set of available recipes. The process then ends at block 850.

Figure 9:
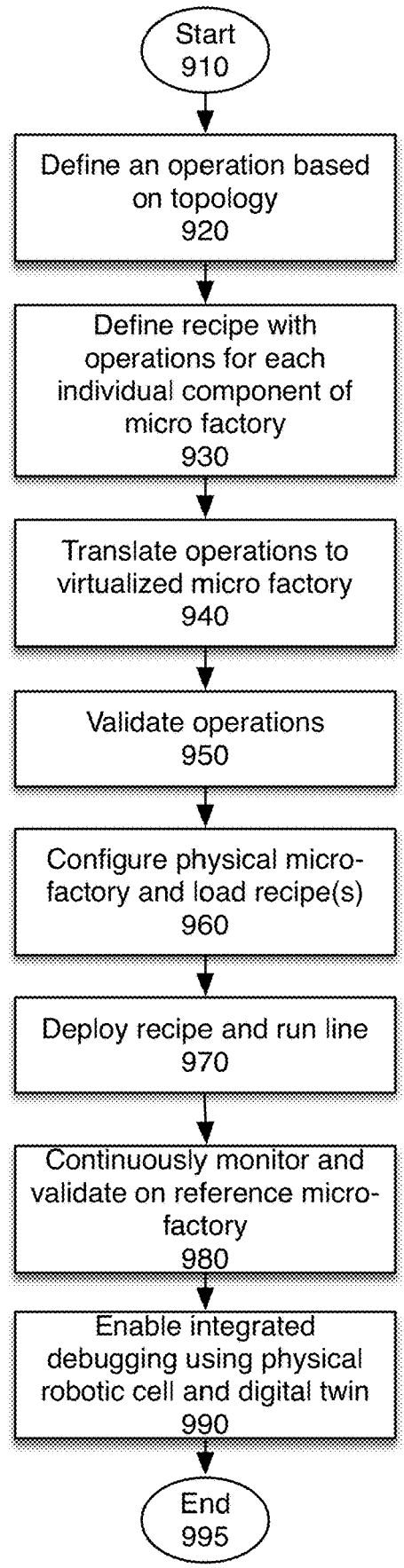
FIG. 9 is a flowchart of one embodiment of applying a recipe to a micro-factory to run a line.

FIG. 9 is a flowchart of one embodiment of applying a recipe to a micro-factory to run a line. The process starts at block 910.

At block 920, the operation is defined based on the topology of the robotic cell(s) of the micro-factory.

At block 930, the recipe is defined with operations for each individual component in the micro-factory. As noted above, a micro-factory may include dozens of robotic cells connected via conveyor belt(s), or may consist of a single robotic cell.

At block 940, the system translates the operations to a reference micro-factory. A reference micro-factory is the build-up of the set of digital twin robotic cells, and the interconnections between the robotic cells. While each digital twin of a robotic cell is self-contained, a reference micro-factory encompasses not only the robotic cells but the component feeders, conveyors, and optionally other devices in the micro-factory.

At block 950, the process is validated on the reference micro-factory. In one embodiment, because each robotic cell is represented by its digital twin, including its configuration, calibration, and limitations, the reference micro-factory is an accurate representation of a physical production line of the micro-factory. Once the validation is complete (which may require changes to the layout and/or recipe), the process continues to block 960.

At block 960, the actual micro-factory is configured, and the recipe(s) are loaded onto the micro-factory.

At block 970, the recipe(s) are deployed and the physical micro-factory is run. This manufactures or assembles the product. In one embodiment, the process on the physical micro-factory is continuously monitored and validated on the reference micro-factory, at block 980. The continuous monitoring in one embodiment includes recording state data, sensor data, and operation data from the physical micro-factory, which is referred to as an Internet-of-Things (IoT) enabled system. The data from the physical micro-factory is used to adjust the digital twin to maintain an accurate representation of the physical micro-factory. In one embodiment, the system receives data from a physical robotic cell, is able to deploy updates to the robotic cell, and can thus remotely manage the robotic cell. In one embodiment, the system analyzes data received from the plurality of sensors to determine the existence of deviations from normal operation of the physical micro-factory, updating parameters in the reference micro factory model based on deviations from normal operation, and revising strategies to achieve an operational goal of the micro factory to accommodate deviations from normal operation.

At block 990, the process in one embodiment provides an integrated debugger. The integrated debugger utilizes logged sensor data from the continuous monitoring, to provide "live" debugging remotely, enable step-through execution of a recipe for debugging, remotely, replay debugging, and simulation debugging.

In one embodiment, this process provides continuous monitoring and debugging, and enables, when appropriate, revising the strategies to achieve the operational goals of the micro-factory, accommodating the deviations from normal operation. This provides a consistent quality and consistency for the micro-factory.

Figure 10:
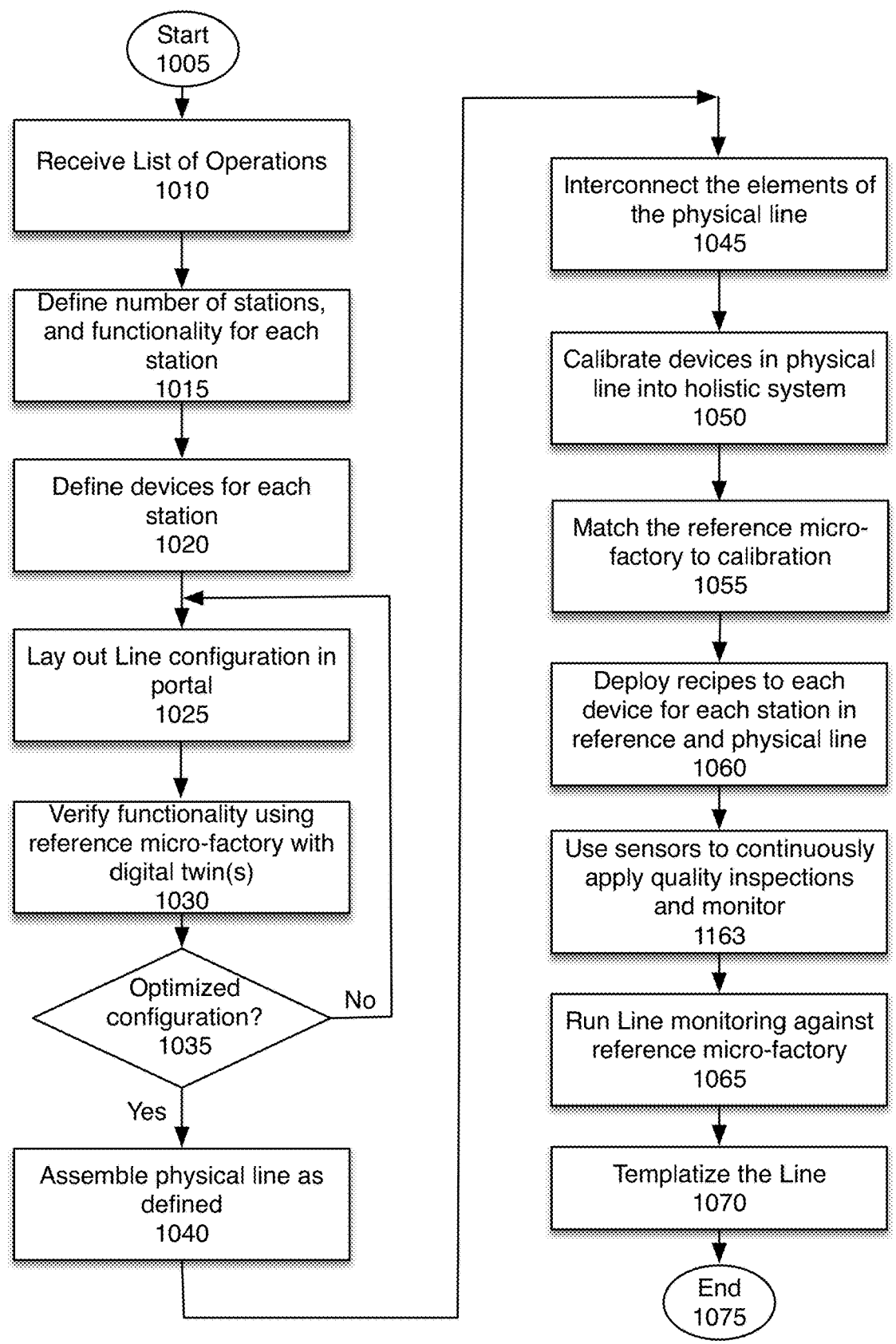
FIG. 10 is a more detailed flowchart of one embodiment of deploying a micro-factory.

FIG. 10 is a more detailed flowchart of one embodiment of deploying a micro-factory. The process starts at block 1005. At block 1010, a list of operations is received. In one embodiment, this may be generated by a user. In one embodiment, as discussed above, this may be auto-generated, in part. In one embodiment, this may be a previously validated recipe that is obtained from a marketplace for sharing recipes.

At block 1015, the number of stations and functionality of each station is defined. A station, in one embodiment, is an element which performs a particular function or set of functions, which may be implemented by one or more robotic cells.

At block 1020, the devices for each station are defined. The devices are individual robotic cells. In one embodiment, the devices may be parallel devices, e.g. two robotic cells which execute the same actions. The devices may be a series of robotic cells which execute different parts of the function associated with the station.

At block 1025, the line configuration is laid out. The line configuration in one embodiment is laid out in a virtual system. In one embodiment, this virtualized version of the micro-factory is referred to as a reference micro-factory, as discussed above.

At block 1030, the functionality of the micro-factory layout is tested, using the reference micro-factory, with the digital twin representation of each of the robotic cells At block 1035, the process determines whether the configuration is optimized. In one embodiment, running the micro-factory layout can determine where there is a bottleneck in the process, e.g. if some step(s) take longer than the other steps, so that the process is slowed. The system can be reconfigured to speed up those portions of the process, either by reconfiguring the steps for each device, by doubling up on devices for those steps, or by otherwise altering the layout. Thus, if there are one or more such bottlenecks, the process returns to block 1025 to reconfigure the line.

If the configuration does not have any unacceptable bottlenecks, the process continues to block 1040.

At block 1040, the physical line is assembled as defined.

At block 1045, the elements of the physical line are interconnected.

At block 1050, the devices in the physical line are calibrated into a holistic system. The system is considered as a holistic system because not only the individual robotic cells but all intermediary and support elements, e.g. conveyor belt(s), tray feeder(s), etc. are also part of the system.

At block 1055, the reference micro-factory is matched to the calibration of the physical micro-factory. The reference micro-factory is designed to match the configuration, calibration, and actions of the physical micro-factory. It is used, in one embodiment, for testing the functionality prior to activation, but also to continuously monitoring the physical micro-factory to detect deviations from normal operation.

At block 1060, the recipe is deployed to the micro-factory and the reference micro-factory. Recipes are deployed to each individual robotic cell and interconnecting elements.

At block 1063, the sensor data, including camera, are used to continuously monitor the system. This can be used for in-process inspection, identify potential improvements or problems, which may or may not be directly connected to the current process. Effectively this integrates automated quality inspection throughout the process, rather than relying on an end-of-process final inspection. By leveraging the existing sensor data to integrate inspection steps into the pipeline, issues can be identified more rapidly, and can be quickly resolved. In one embodiment, this monitoring is real time.

At block 1065, the line is run, monitoring against the reference micro-factory. As noted above, this may be used to address deviations from normal operation, identify errors or issues, etc.

At block 1070, in one embodiment, the line is templatized. Templatizing, in one embodiment, means that the reference micro-factory set-up is stored, and the micro-factory layout is made available. In one embodiment, such a micro-factory layout and associated recipes may be made available on a marketplace. This may enable a manufacturer to obtain a complete set of instructions to manufacture or assemble a product, install it on an existing set of robotic cells in a micro-factory, and start manufacturing very rapidly. It also allows a manufacturer with multiple sites to create a micro-factory set up in one location, validate it, and then distribute the configuration and recipe to other locations to ramp up production rapidly. The process then ends at block 1075.

Figure 11:
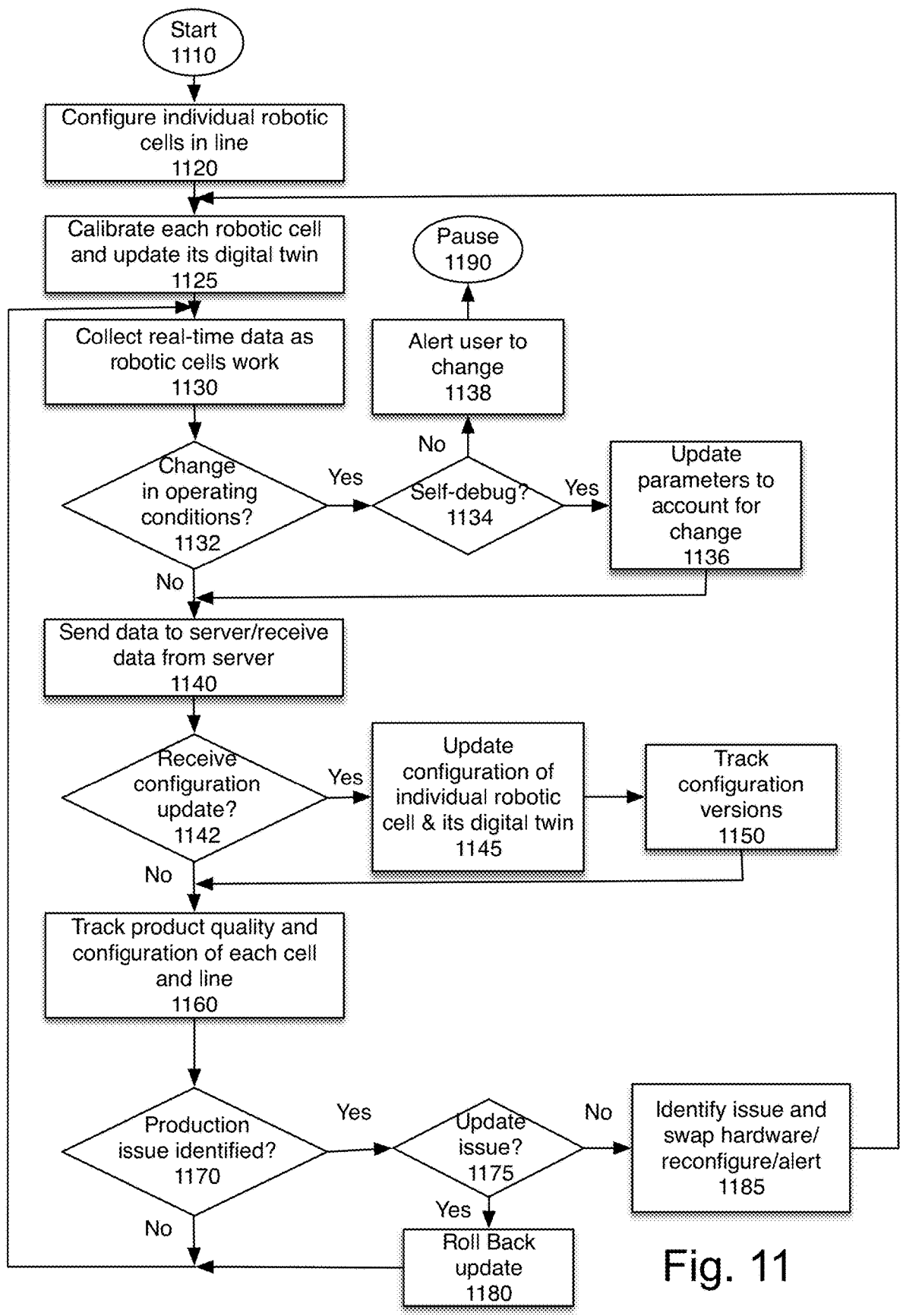
FIG. 11 is a flowchart of one embodiment of robotic cell reconfiguration, and version control.

FIG. 11 is a flowchart of one embodiment of robotic cell reconfiguration, and version control. The process starts at 1110.

At block 1125, each robotic cell in a micro-factory is calibrated, and the calibration is reflected by the associated digital twin. In one embodiment, the system utilizes an auto-calibration mechanism, as described in co-pending patent application entitled "Auto-Calibration System for Robotic Assembly" (15000P0105Z), which is incorporated herein by reference in its entirety.

At block 1130, sensor and state data is collected from the robotic cell, as it works. The real-time data may include camera data, data from sensors such as temperature sensors, barometric pressure sensors, motion sensors, vibration sensors, lasers, ultraviolet or infrared sensors, etc. In one embodiment, this data is uploaded to the server.

At block 1132, the process determines whether the sensor and state data indicates that there is a change in the operating conditions that would impact the robotic cell. Such changes may include a change in temperature, a change in vibration, wear and tear. An issue may be any change in the operating conditions that may impact the operation of the robotic cell. If so, at block 1134, the process determines whether the robotic cell can self-debug. Self-debugging is an adjustment to one or more parameters of the robotic cell to account for the change in the operating conditions. If the system can self-debug, it does so at block 1136, and then continues to block 1140. If the system cannot self-debug to address the issue, at block 1138, the system alerts a user to the issue. In one embodiment if the issue is urgent, the process pauses until it is resolved. In one embodiment, if the issue is not urgent, the process may continue.

At block 1140, the data from the sensors is sent to the server. Data can also be received from the server. In one embodiment, the data is uploaded to the server continuously. In one embodiment, data is uploaded once per second. Data may be received from the sensor when the robotic cell configuration should be updated, or the robotic cell should be stopped.

At block 1142, the process determines whether a configuration update was received. In one embodiment, configuration updates may be sent to update the process executed by the robotic cell. If a configuration update was received, at block 1145, the configuration of the robotic cell, and its associated digital twin, are updated. At block 1150 the configuration versions are tracked. That is, in one embodiment, the server monitors the updates, and keeps all configuration and calibration data for the prior version of the configuration. The process then continues to block 160.

At block 1160, the product quality and configuration of each robotic cell, and the entire micro-factory line, are tracked. In one embodiment, at the end of a production line the resulting product is tested and its quality is validated. In one embodiment this information is used to track production quality. In one embodiment, a subsequent robotic cell may detect an issue.

For example a first robotic cell may attach a socket to a printed circuit board, and a next robotic cell inserts a chip into the socket. If the next robotic cell detects that sockets are misaligned, or otherwise problematic, that may be identified by the product quality tracking as well.

At block 1170, the process determines whether a production issue has been identified. If no production issue is identified the process returns to block 1130, to continue collecting data as the robotic cell works.

If a production issue is identified, at block 1175, the process determines whether the production issue was caused by a configuration update pushed to the robotic cell. If so, at block 1180 the update may be rolled back, e.g. reversed. Because the system stores the full configuration of the prior version, the rollback of an update can be accomplished quickly. In one embodiment, the rollback may not require human interaction. The process then returns to block 1030, to continue monitoring the robotic cell in action. If the issue is not a simple update issue, at block 1185 the issue is identified. The issue may be resolvable by swapping a hardware element (e.g. changing the end-of-arm tool which has an issue), or by reconfiguring an element. In some embodiments, such changes may be made automatically when possible. Otherwise, a user is alerted to make the change. Once the element is changed, the process returns to block 1125 to recalibrate the robotic cell.

In this way the system can continuously monitor a micro-factory, update robotic cells as needed, and roll back updates when necessary.

Figure 12:
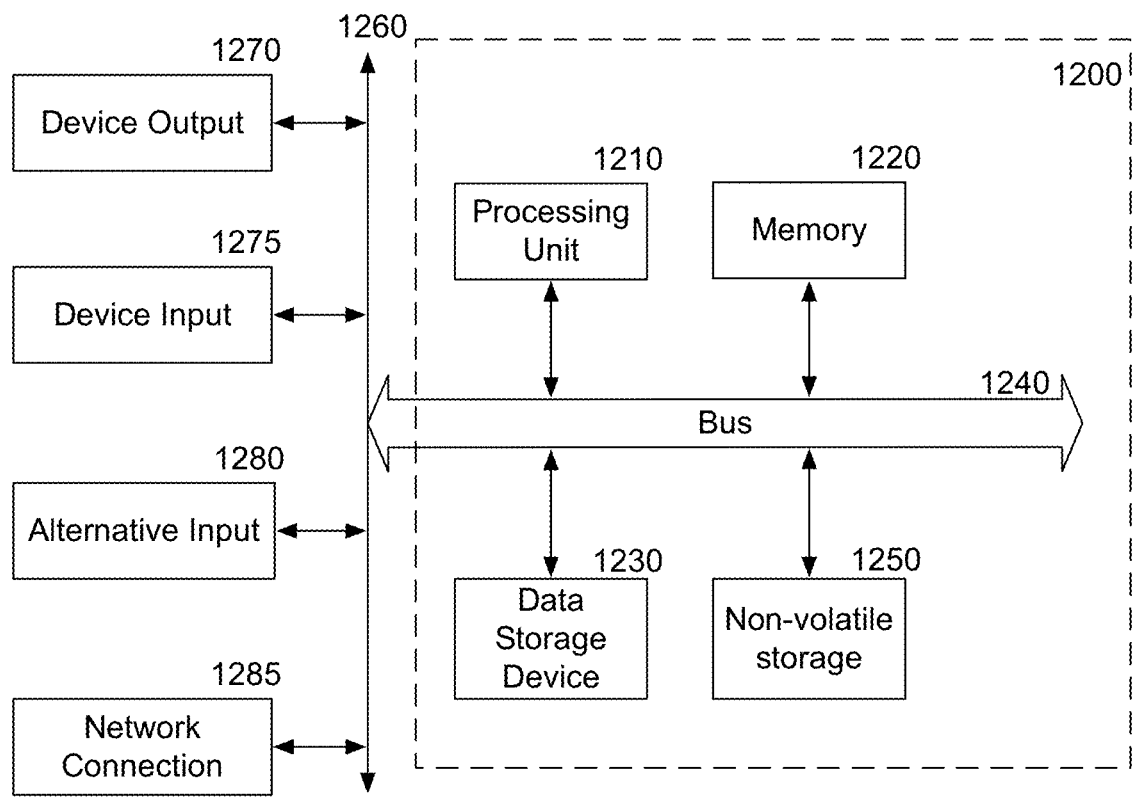
FIG. 12 is a block diagram of one embodiment of a computer system which may be used with the present application.

FIG. 12 is a block diagram of one embodiment of a computer system that may be used with the present invention. It will be apparent to those of ordinary skill in the art, however that other alternative systems of various system architectures may also be used.

The data processing system illustrated in FIG. 12 includes a bus or other internal communication means 1240 for communicating information, and a processing unit 1210 coupled to the bus 1240 for processing information. The processing unit 1210 may be a central processing unit (CPU), a digital signal processor (DSP), or another type of processing unit 1210.

The system further includes, in one embodiment, a random access memory (RAM) or other volatile storage device 1220 (referred to as memory), coupled to bus 1240 for storing information and instructions to be executed by processor 1210. Main memory 1220 may also be used for storing temporary variables or other intermediate information during execution of instructions by processing unit 1210.

The system also comprises in one embodiment a read only memory (ROM) 1250 and/or static storage device 1250 coupled to bus 1240 for storing static information and instructions for processor 1210. In one embodiment, the system also includes a data storage device 1230 such as a magnetic disk or optical disk and its corresponding disk drive, or Flash memory or other storage which is capable of storing data when no power is supplied to the system. Data storage device 1230 in one embodiment is coupled to bus 1240 for storing information and instructions.

The system may further be coupled to an output device 1270, such as a cathode ray tube (CRT) or a liquid crystal display (LCD) coupled to bus 1240 through bus 1260 for outputting information. The output device 1270 may be a visual output device, an audio output device, and/or tactile output device (e.g. vibrations, etc.)

An input device 1275 may be coupled to the bus 1260. The input device 1275 may be an alphanumeric input device, such as a keyboard including alphanumeric and other keys, for enabling a user to communicate information and command selections to processing unit 1210. An additional user input device 1280 may further be included. One such user input device 1280 is cursor control device 1280, such as a mouse, a trackball, stylus, cursor direction keys, or touch screen, may be coupled to bus 1240 through bus 1260 for communicating direction information and command selections to processing unit 1210, and for controlling movement on display device 1270.

Another device, which may optionally be coupled to computer system 1200, is a network device 1285 for accessing other nodes of a distributed system via a network. The communication device 1285 may include any of a number of commercially available networking peripheral devices such as those used for coupling to an Ethernet, token ring, Internet, or wide area network, personal area network, wireless network or other method of accessing other devices. The communication device 1285 may further be a null-modem connection, or any other mechanism that provides connectivity between the computer system 1200 and the outside world.

Note that any or all of the components of this system illustrated in FIG. 12 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 1220, mass storage device 1230, or other storage medium locally or remotely accessible to processor 1210.

It will be apparent to those of ordinary skill in the art that the system, method, and process described herein can be implemented as software stored in main memory 1220 or read only memory 1250 and executed by processor 1210. This control logic or software may also be resident on an article of manufacture comprising a computer readable medium having computer readable program code embodied therein and being readable by the mass storage device 1230 and for causing the processor 1210 to operate in accordance with the methods and teachings herein.

The present invention may also be embodied in a handheld or portable device containing a subset of the computer hardware components described above. For example, the handheld device may be configured to contain only the bus 1240, the processor 1210, and memory 1250 and/or 1220.

The handheld device may be configured to include a set of buttons or input signaling components with which a user may select from a set of available options. These could be considered input device #1 1275 or input device #2 1280. The handheld device may also be configured to include an output device 1270 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 1210, a data storage device 1230, a bus 1240, and memory 1220, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 1285.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 1210. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A software defined manufacturing system comprising:
    a physical robotic cell including a plurality of sensors, the physical robotic cell controlled by a recipe instructing the physical robotic cell to perform a process;
    a memory to collect operational data from the physical robotic cell, the operational data including the process and concurrent data from the plurality of sensors;
    a processor implementing a digital twin of the physical robotic cell, the digital twin configured with sensor data and state data from the physical robotic cell to represent the physical robotic cell;
        wherein the recipe is tested on the digital twin, and the recipe is then remotely deployed to the physical robotic cell and a set of dependencies is identified for a particular command or action in the recipe;
        wherein the digital twin is used to validate and monitor the physical robotic cell and provide a visual representation of the physical robotic cell, the digital twin configured to enable previewing of actions of the physical robotic cell during a process, track the actions of the physical robotic cell during the process, and review the actions after the process, and provide a non-visual representation of the physical robotic cell; and
    an integrated debugger to enable debugging the physical robotic cell utilizing the recipe and the operational data from the execution of the recipe of the physical robotic cell, the integrated debugger configured to display a step-by-step execution of the recipe, with associated operational data on the digital twin;
    wherein data aggregation collects and logs data from cameras and the plurality of sensors in the physical robotic cell for training, tracking effectiveness of the recipe by machine learning; and
    a machine learning and self-improvement system to iteratively alter settings in the physical robotic cell, monitor and evaluate results of the alteration, and provide continuous improvement of process parameters.

2. The software defined manufacturing system of claim 1, further comprising:
a configuration management system to track a state of the physical robotic cell, the configuration management system enabling deploying changes to the physical robotic cell, and rolling back changes from the physical robotic cell.

3. The software defined manufacturing system of claim 2, wherein the state of the physical robotic cell includes hardware, software, settings, and the recipe.

4. The software defined manufacturing system of claim 2, further comprising:
deployment management system to enable deployment of one or more configuration changes to the physical robotic cell, wherein the deployment management system enables deployment to a selected one or more robotic cells via a cloud-based system.

5. The software defined manufacturing system of claim 1, further comprising:
wherein the physical robotic cell is calibrated using the sensors, and calibration data is used to update the digital twin.

6. The software defined manufacturing system of claim 1, further comprising:
development tools to create the recipe using declarative programming;
a compiler to compile the recipe to robotic commands; and
one or more drivers associated with devices of the physical robotic cell, to translate the robotic commands to device-specific commands, thereby enabling device agnostic recipes.

7. The software defined manufacturing system of claim 1, further comprising:
a programming interface to create the recipe based on data obtained from the physical robotic cell, the programming interface providing an application user interface based on a topology of the physical robotic cell.

8. The software defined manufacturing system of claim 7, wherein the recipe is compiled to device-specific commands, which enables use of a heterogeneous set of parts within the physical robotic cell, abstracting the recipe from a particular device definition.

9. The software defined manufacturing system of claim 1, further comprising:
one or more physical robotic cells defining a physical micro-factory to perform a process;
wherein individual robotic cells in the physical micro-factory can be reconfigured, such that the physical micro-factory continues to function when a new robotic cell is added or a robotic cell is removed from the physical micro-factory.

10. The software defined manufacturing system of claim 1, further comprising:
an inspection system configured to utilize the sensors in the physical robotic cell to provide in-process inspection which need not be directly connected to a current process.

11. The software defined manufacturing system of claim 1, further comprising:
a design-for-manufacture-or-automation (DFMA) system to use develop computer aided design (CAD) data for a product to be manufactured based on manufacturing capabilities of the physical robotic cell.

12. The software defined manufacturing system of claim 11, wherein the CAD data is refined based on the sensor data and the state data from the physical robotic cell.

13. The software defined manufacturing system of claim 1, further comprising:
automatically generating a portion of the recipe based on data from a computer aided design (CAD) system.

14. The software defined manufacturing system of claim 1, wherein the integrated debugger enables one or more of: remote live debugging of the physical robotic cell using the sensor data, replay of a set of steps on the digital twin using the sensor data, and simulation debugging on the digital twin.

15. The software defined manufacturing system of claim 1, further comprising:
the integrated debugger further configured to enable stepwise debugging while controlling the physical robotic cell.

16. The software defined manufacturing system of claim 1, further comprising:
a micro-factory enabling reconfiguration of individual robotic cells, to continue functioning when a robotic cell is added to, or removed from, the micro-factory.

17. The software defined manufacturing system of claim 1, further comprising:
a network interface in the physical robotic cell, enabling the physical robotic cell to be upgraded remotely.

18. The software defined manufacturing system of claim 1, further comprising:
the integrated debugger further configured to provide instant replay for debugging, enabling the digital twin to mirror each of the actions of the physical robotic cell at varying speeds based on the operational data and the recipe, to enable investigation of what occurred during a process.

19. A computer-implemented method of operating software defined manufacturing system comprising:
executing a recipe in a physical robotic cell including a plurality of sensors, the recipe instructing the physical robotic cell to perform a process;
collecting operational data from the physical robotic cell, the operational data including the process and concurrent data from the plurality of sensors;
implementing a digital twin of the physical robotic cell, the digital twin configured with sensor data and state data from the physical robotic cell to represent the physical robotic cell;
wherein the recipe is tested on the digital twin, and the recipe is then remotely deployed to the physical robotic cell and a set of dependencies is identified for a particular command or action in the recipe;
wherein the digital twin is used to validate and monitor the physical robotic cell and provide a visual representation of the physical robotic cell, the digital twin configured to enable previewing of actions of the physical robotic cell during a process, track the actions of the physical robotic cell during the process, and review the actions after the process, and provide a non-visual representation of the physical robotic cell; and
debugging, using an integrated debugger, the physical robotic cell utilizing the recipe and the operational data from the execution of the recipe of the physical robotic cell, the integrated debugger configured to display a step-by-step execution of the recipe, with associated operational data on the digital twin;
collecting and logging data from cameras and the plurality of sensors in the physical robotic cell for training, tracking effectiveness of the recipe by machine learning; and iteratively altering settings in the physical robotic cell, monitoring and evaluating results of the alteration, and providing continuous improvement of process parameters by a machine learning and self-improvement system.

20. The computer-implemented method of claim 19, further comprising:

combining a plurality of physical robotic cells to define a physical micro-factory to perform a second process;

wherein one or more of the physical robotic cells in the physical micro-factory can be reconfigured for executing the second process.

* * * * *